(12) United States Patent
Tran

(10) Patent No.: US 12,737,653 B1
(45) Date of Patent: Sep. 15, 2026

(54) HYBRID EXPERT SYSTEM AND LARGE LANGUAGE MODEL (LLM) ARCHITECTURE

(71) Applicant: Bao Q. Tran, Saratoga, CA (US)

(72) Inventor: Bao Q. Tran, Saratoga, CA (US)

( * ) Notice: Subject to any disclaimer, the term of this patent is extended or adjusted under 35 U.S.C. 154(b) by 0 days.

(21) Appl. No.: 19/222,501

(22) Filed: May 29, 2025

(51) Int. Cl.
*G06N 5/045* (2023.01)
*G06F 18/21* (2023.01)

(52) U.S. Cl.
CPC ........... *G06N 5/045* (2013.01); *G06F 18/217* (2023.01)

(58) Field of Classification Search
CPC ............ G06N 5/045; G06N 5/00; G06N 5/02; G06N 3/04; G06N 3/08; G06F 18/217
See application file for complete search history.

(56) References Cited

U.S. PATENT DOCUMENTS

| | | | | |
|---|---|---|---|---|
| 2024/0070434 A1* | 2/2024 | Garg | ...................... | G06N 20/00 |
| 2025/0103625 A1* | 3/2025 | Addanki | ............. | G06F 16/3329 |
| 2025/0259075 A1* | 8/2025 | Crabtree | ................ | G06N 3/094 |
| 2025/0265511 A1* | 8/2025 | Olohan | .............. | G06Q 10/0631 |
| 2025/0285027 A1* | 9/2025 | Poulis | .................... | G06N 3/042 |

FOREIGN PATENT DOCUMENTS

WO WO-2025093339 A1 * 5/2025 ........... G06F 16/243

* cited by examiner

*Primary Examiner* — Kamran Afshar
*Assistant Examiner* — Brian J Hales
(74) *Attorney, Agent, or Firm* — PatentPC

(57) ABSTRACT

One implementation describes a computer-implemented system and method that integrates expert system techniques with large language models to generate controlled, domain-specific answers. It works by receiving user queries through an interface and analyzing them to identify the relevant domain and subdomain. The system then employs multiple domain-specific expert subsystems—using rule-based and case-based reasoning, structured knowledge bases, and ontologies—to retrieve information through both semantic vector and token-based searches. Candidate answers with confidence scores are generated and processed by specialized, fine-tuned LLMs that deliver natural language explanations and responses, while a weighting engine combines outputs and an output guardrail ensures compliance with regulatory, ethical, and domain-specific standards. A refinement module further adjusts answers by re-ranking, cross-referencing with current peer-reviewed material, and normalizing against historical or real-world data, with human-in-the-loop review available if needed.

20 Claims, 5 Drawing Sheets

HYBRID EXPERT SYSTEM AND LARGE LANGUAGE MODEL (LLM) ARCHITECTURE

BACKGROUND OF THE INVENTION

In recent years, the field of artificial intelligence has seen significant advancements through the integration of classical expert system methodologies with modern large language models. Traditional expert systems, built on rule-based logic and domain-specific knowledge, have long been valued for their capacity to provide deterministic and transparent decision-making in specialized fields. At the same time, large language models have demonstrated remarkable proficiency in natural language understanding and generation by leveraging extensive datasets and deep neural networks. The convergence of these two approaches holds promise for enhancing controlled and domain-specific answer generation, combining the precision and reliability of expert knowledge with the flexibility and broad contextual understanding offered by large language systems. This hybrid approach reflects a broader trend in AI research aimed at reconciling structured, rule-based reasoning with the adaptive, data-driven capabilities of contemporary language models.

SUMMARY OF THE INVENTION

One aspect relates to a computer-implemented system and method for generating controlled, domain-specific answers by leveraging a hybrid architecture that combines expert system techniques with large language models. The system receives user queries via an interface and employs an expert system module—comprising domain-specific subsystems with rules engines, structured knowledge bases, and ontologies—to identify the relevant domain and subdomain, retrieve task-relevant information using both semantic vector and token-based search engines, and generate candidate answers with confidence scores. Simultaneously, fine-tuned large language model modules process the query alongside the retrieved information and candidate answers to produce natural language explanations and responses that incorporate evidence from external sources. A weighting engine combines and refines these outputs, while an output guardrail module and refinement module validate, cross-reference, and adjust the generated answers against compliance rules, domain standards, peer-reviewed evidence, and historical data to mitigate biases and inflated claims. The system is adaptable to various fields—such as medical, legal, or general problem solving—with each implementation involving the expert system's analysis of the query, generation of candidate responses, and subsequent integration with specialized large language models to provide a verified, transparent final answer along with supporting references.

Advantages of one implementation may include one or more of the following:

1. Enhanced Precision and Accuracy:
   - The hybrid architecture leverages both deterministic expert system rules and the expansive contextual understanding of large language models to generate answers that are both accurate and relevant to the specified domain.
   - The dual-layer validation process (via expert system checks and large language model cross-referencing) reduces the likelihood of errors and mitigates biases inherent in data-driven solutions.
2. Improved Transparency and Traceability:
   - The system incorporates domain-specific rules and an evidence-based refinement process, allowing users to trace generated answers back to specific data sources, domain guidelines, or compliance rules.
   - The use of confidence scores and peer-reviewed references ensures that decision-making is auditable and that the rationale behind each answer is clear.
3. Flexibility and Adaptability:
   - One implementation is designed to be adaptable across a range of fields, such as medical, legal, or general problem-solving applications.
   - Each domain-specific implementation can leverage tailored subsystems (ontologies, structured knowledge bases, rule engines) while integrating seamlessly with fine-tuned large language models, making it a versatile tool for varied applications.
4. Enhanced Natural Language Generation:
   - By combining robust candidate response generation with fine-tuned large language model modules, the final output is not only factually correct but also articulated in clear, natural language suitable for end-user comprehension.
   - The integration of natural language explanations alongside technical evidence improves user trust and understanding.
5. Robust Quality Control and Compliance:
   - An output guardrail module, alongside a refinement system that cross-references compliance rules, domain standards, and historical data, minimizes the risk of generating inappropriate, biased, or inflated claims.
   - This layered validation ensures adherence to industry standards and regulatory requirements, which is particularly important in sensitive fields such as healthcare and law.
6. Scalability and Efficiency:
   - The system's architecture is designed to handle a wide range of user queries efficiently by matching them with the most relevant domain-specific modules and search engines (semantic vector and token-based).
   - This modular approach not only streamlines response time but also allows for straightforward scalability as domain knowledge evolves or expands.
7. Evidence-Based Decision Support:
   - The inclusion of external evidence sources and historical data in generating responses provides users with a richer, well-supported answer, enhancing the system's role in decision support scenarios.
   - By presenting verifiable references and a quantified confidence score, users benefit from increased trust and reliability in the system's recommendations.

These advantages collectively demonstrate how the disclosed one implementation offers a significant improvement over traditional systems by combining the determinism and transparency of expert systems with the innovative, adaptive capabilities of modern large language models.

In another aspect, a computer-implemented method for delivering highly controlled, domain-specific answers to user queries spanning fields such as medical, legal, and scientific fields. The method leverages a hybrid architecture that integrates expert systems with specialized large language models (LLMs). When a user submits a query, the system first identifies the pertinent subdomain—such as a medical specialty, legal practice area, or scientific discipline—and selects the appropriate set of expert rules and domain ontologies. Specialized agentic LLMs, each fine-tuned for their respective fields, are then assigned to process the query. The expert system retrieves structured knowledge from relevant ontologies, prior training data, and rules databases, which include relationships among entities, standard procedures, and authoritative references. Using this information, the expert system generates a set of candidate analyses, diagnoses, or answers tailored to the user's question.

These candidates, along with the original query and supporting references, are input into the assigned LLMs, which generate natural language explanations and final answers. Importantly, these explanations include logical reasoning and clear references to supporting evidence from domain literature, statutes, or scientific data. The expert system then verifies the consistency and validity of the LLM-generated answer using rule-based or case-based reasoning, ensuring that the output is both logically sound and aligned with established standards. The system is also designed to continuously update its knowledge base by incorporating newly published peer-reviewed content, regulatory updates, or case law, and by normalizing efficacy or outcome data against existing standards or regimens. This process includes discounting inflated claims or biases in new results by benchmarking them against historical or real-world data, further enhancing the reliability of the system's outputs. Finally, the verified answer and its accompanying natural language explanation are provided to the user.

This integrated approach leads to a significant increase in performance across several dimensions. By dynamically selecting the most relevant rules and LLMs for each query, the system ensures that answers are informed by the highest-quality, most up-to-date domain expertise. The expert system's verification step reduces errors and hallucinations, while the use of structured ontologies and rules databases ensures logical consistency and evidence-based reasoning. The system's ability to continuously learn from new information and to normalize new findings against established outcomes further improves accuracy and trustworthiness. Specialized LLMs and multi-agent workflows enable efficient, scalable processing of complex queries, while support for iterative dialogue and confidence indicators enhances the user experience. Ultimately, the method delivers answers that are not only more accurate, reliable, and current, but also transparent and actionable, building user trust and satisfaction.

DETAILED DESCRIPTION OF THE INVENTION

Figure 1:
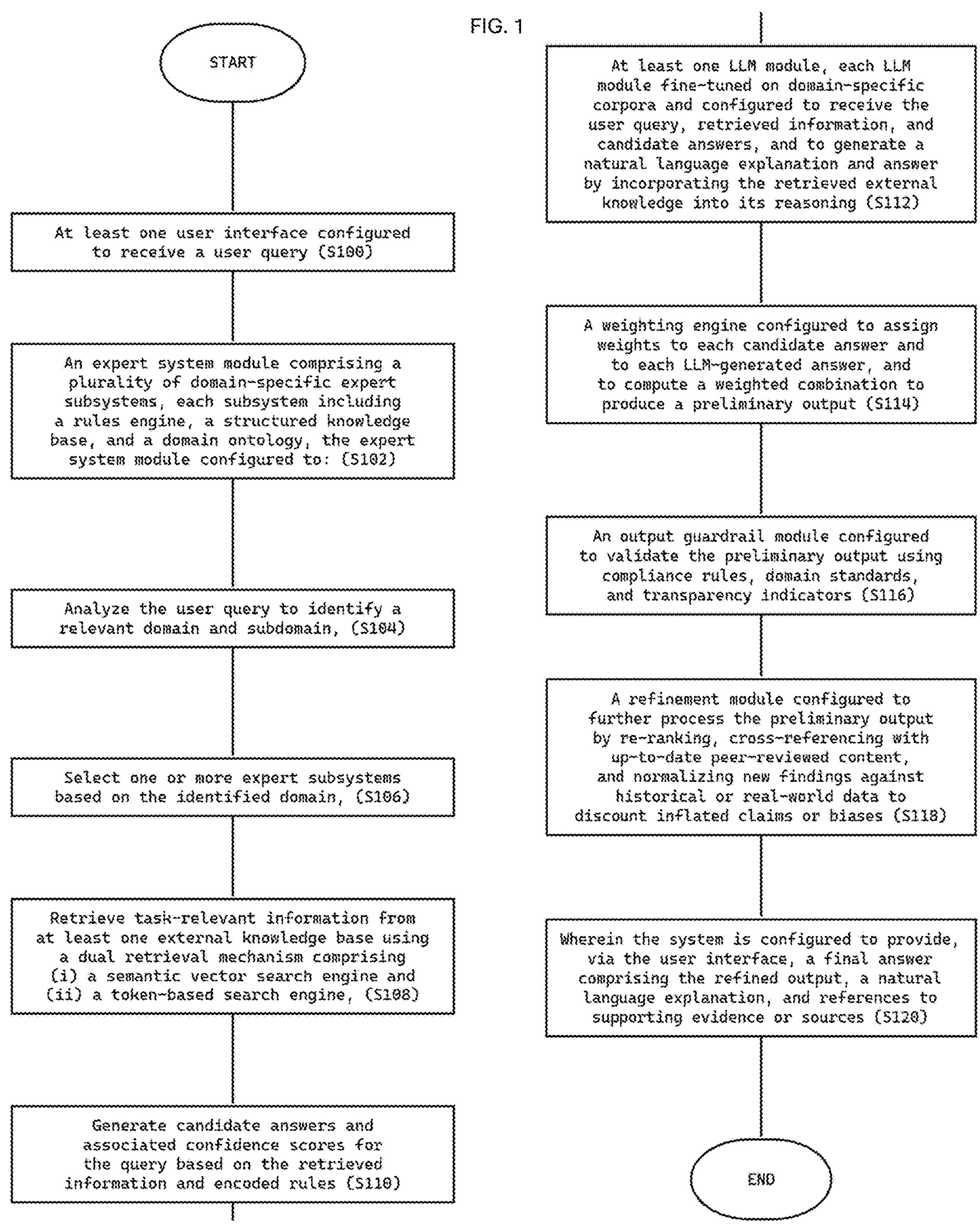
FIG. 1 illustrates a flowchart for a hybrid expert system and LLM architecture for domain-specific answer generation.

The system further incorporates at least one LLM module (S110) that has been fine-tuned on domain-specific corpora and is configured to receive the user query, the retrieved information, and the candidate answers. This LLM module then produces a natural language explanation and answer by integrating the external knowledge into its reasoning process (S112). Afterward, a weighting engine assigns weights to each candidate answer as well as to the LLM-generated answer, calculating a weighted combination to produce a preliminary output (S114). An output guardrail module subsequently validates this preliminary output according to compliance rules, domain standards, and transparency indicators (S116).

Finally, a refinement module further processes the preliminary output by re-ranking, cross-referencing it with current peer-reviewed content, and normalizing new findings against historical or real-world data to mitigate any inflated claims or biases (S118). The system then delivers a final answer via the user interface that includes the refined output, a natural language explanation, and references to supporting evidence or sources (S120).

The reference label "at least one user interface configured to receive a user query S100" pertains to a component of the system that establishes an initial interaction point with the user. This interface is designed to accept input from a user in the form of a query, thereby enabling further processing by the system. Its configuration ensures that the user's input is captured accurately and transmitted reliably to subsequent processing modules, facilitating a seamless user experience without introducing unnecessary complexity.

Reference label S102 identifies an expert system module that is structured as a collection of domain-specific expert subsystems. Each subsystem within this module comprises a rules engine, a structured knowledge base, and a domain ontology. The rules engine applies predetermined rules that govern domain-specific inference and decision-making processes. The structured knowledge base organizes and stores relevant domain information, while the domain ontology defines the relationships and interdependencies among the various entities within the domain. Together, these components allow the expert system module to analyze user queries effectively by determining the pertinent domain and subdomain, retrieving task-relevant information, and facilitating the generation of candidate answers with corresponding confidence scores. This architecture ensures that the inquiry is examined through a contextually appropriate lens and supports the production of responses that adhere to the standards and conventions of the associated domain.

In one embodiment, the system analyzes the user query to identify a relevant domain and subdomain. The process involves evaluating the content of the query to extract key indicators and context that point toward a specific field of expertise. This determination guides the subsequent selection of domain-specific expert subsystems, ensuring that the rules engine and corresponding knowledge bases are tailored to address the particular nuances of the query. The analysis incorporates both syntactic and semantic methods to accurately classify the domain, thereby facilitating precise retrieval of structured knowledge and enabling targeted candidate answer generation.

In one embodiment, S108 describes the process of retrieving task-relevant information from at least one external knowledge base using a dual retrieval mechanism. This mechanism employs a semantic vector search engine that analyzes conceptual similarity and contextual clues to identify relevant data, while simultaneously utilizing a token-based search engine to match specific terms or tokens. The combined functionality of these two search engines enhances the accuracy and depth of the information retrieved, thereby supporting the subsequent generation of candidate answers.

The disclosed one implementation includes a feature wherein the expert system generates candidate answers for the query and computes associated confidence scores based on both retrieved information and pre-encoded rules. This function, indicated by the reference label S110, follows the retrieval of task-relevant information and leverages domain-specific rules stored within the system's knowledge bases and ontologies. The process entails evaluating the gathered data against a defined set of criteria and generating potential responses that reflect the degree of certainty in relation to the input query. Each candidate answer is weighted by a confidence score that quantifies its reliability and adherence to the domain's established practices, thereby providing a measure for further processing and selection by subsequent modules in the system.

The system comprises at least one large language model module that is fine-tuned using domain-specific corpora. This module is specifically configured to receive the user query, task-relevant information retrieved from external sources, and candidate answers generated by the expert system. It processes these inputs by incorporating the external knowledge into its reasoning process, thereby generating a natural language explanation and answer. The module's configuration allows it to interpret and integrate domain-specific details effectively, ensuring that the explanation and final answer reflect current authoritative knowledge and are contextually accurate.

The disclosed one implementation includes a weighting engine that is designed to assign distinct weights to each candidate answer generated by the expert system as well as to each answer provided by the large language model. This engine then computes a weighted combination of these outputs, resulting in a preliminary output that reflects the differing levels of confidence across the provided answers. The assignment of weights and the subsequent combination of answers allow the system to synthesize its responses in a balanced manner before further validation and refinement occur.

The output guardrail module, designated as S116, is responsible for the systematic validation of the preliminary output. It checks that the generated answer complies with established rules and domain-specific standards while adhering to defined transparency indicators. This module functions as a final quality control step, confirming that the answer is not only accurate and supported by evidence but also aligned with ethical and regulatory requirements before the result is ultimately provided.

By integrating current verified evidence and historical validation into its re-ranking and normalization processes, the refinement module bolsters the overall reliability and transparency of the system's output. Its operation is central to delivering transparent and accurate responses that are firmly anchored in both contemporary research and established real-world data.

The system is configured to provide a final answer to the user through a user interface. This final answer is comprised of a refined output that has been processed through multiple validation and verification steps. In addition, the system includes a natural language explanation that interprets the answer in clear, comprehensible terms. The explanation is supported by references to external sources, ensuring that all information is traceable and based on external evidence.

The architecture of a hybrid large language model (LLM) and expert system is designed to combine the strengths of both symbolic and subsymbolic artificial intelligence approaches, delivering robust, accurate, and explainable solutions to complex, real-world problems across domains such as medicine, law, and science. At its core, this architecture integrates the deep contextual understanding and generative capabilities of LLMs with the deterministic, rule-based reasoning and domain expertise of expert systems. The resulting system is highly adaptable, scalable, and capable of both immediate response and long-term strategic reasoning.

The system is organized in a modular, layered fashion. The foundational layer consists of one or more expert system modules, each specializing in a particular domain or subdomain. These expert systems are built around structured knowledge bases, which encode domain-specific facts, ontologies, and rules—often in the form of "if-then" statements or more complex logical constructs. The inference engine of each expert system applies these rules to incoming queries, using logical reasoning (such as forward or backward chaining) to derive conclusions, generate candidate answers, and assign confidence scores. This symbolic reasoning ensures that the system can provide transparent, auditable, and domain-compliant outputs, especially for tasks requiring regulatory or ethical rigor.

Parallel to the expert system modules, the architecture incorporates one or more LLM modules. These LLMs are typically fine-tuned on domain-specific corpora and are capable of ingesting not only the original user query but also the candidate answers, supporting evidence, and contextual information retrieved by the expert systems. The LLMs perform advanced natural language understanding and generation, synthesizing information, augmenting context, and producing natural language explanations that are accessible to end users. In many implementations, the LLM acts as a high-level orchestrator, delegating deterministic or rule-based subtasks to the expert system while providing holistic, context-rich analyses and recommendations. The integration layer facilitates seamless communication and data exchange between the expert system modules and the LLM modules [3]. This integration layer often includes a dual retrieval mechanism: a semantic vector search engine for mapping colloquial or ambiguous user input to precise domain concepts, and a token-based search engine for exact retrieval from structured data sources. This ensures that both lay and technical queries are accurately interpreted and addressed. The system also employs a weighting engine or aggregation module, which combines the outputs of the expert systems and the LLMs. Each candidate answer—whether generated by symbolic reasoning or neural inference—is assigned a weight based on factors such as confidence scores, historical accuracy, and relevance to the query. The aggregated output is then subjected to an output guardrail mechanism, which applies compliance checks, validation rules, and transparency indicators to ensure that the final answer is safe, accurate, and aligned with domain-specific standards. A refinement module processes the preliminary output. This module can perform re-ranking, cross-referencing with up-to-date peer-reviewed literature, and normalization of new findings against historical or real-world data. For example, in medical or scientific applications, the system may discount marketing-inflated claims by benchmarking new drug trial results against established treatment regimens, ensuring that recommendations are evidence-based and unbiased. The user interface layer allows users to interact with the system, submit queries, and receive answers. In more advanced implementations, the system supports iterative, multi-turn dialogues, enabling clarification and refinement of both queries and answers. The architecture may also incorporate feedback mechanisms, allowing the system to learn from user input and real-world outcomes, thereby continuously improving its knowledge base, rules, and LLM fine-tuning.

Hybrid agent architectures may further include both reactive and deliberative layers. The reactive layer enables the system to respond instantly to urgent or straightforward queries, while the deliberative layer engages in complex planning, strategic reasoning, and long-term decision-making[4]. This layered approach ensures both immediate responsiveness and deep analytical capability.

Deployment options for such hybrid systems are flexible. They may be implemented as cloud-based platforms, on-premises solutions, or distributed architectures, with expert system and LLM modules hosted on separate servers and communicating via secure APIs. The system can operate in fully automated, human-in-the-loop, or hybrid modes, and supports audit trails, compliance logging, and multi-agent collaboration for tasks requiring specialized expertise.

The system provides a robust, domain-specific solution for generating controlled and reliable answers by integrating a hybrid architecture that combines the strengths of expert systems and large language models (LLMs). In operation, the system receives a user query through an intuitive user interface and, via the expert system module, analyzes the query to determine the appropriate domain and subdomain. The expert system module is itself composed of multiple domain-specific expert subsystems, each equipped with a rules engine, structured knowledge base, and domain ontology, enabling precise retrieval and analysis of task-relevant information from both internal and external knowledge bases. This retrieval is facilitated by a dual retrieval mechanism that leverages both semantic vector search for mapping natural language to domain terminology and token-based search for exact data matches. The expert subsystems generate candidate answers with associated confidence scores, which are then passed-along with the original query and supporting references—to one or more LLM modules. These LLM modules are fine-tuned on domain-specific corpora and are configured to generate natural language explanations and answers that incorporate the retrieved external knowledge. A weighting engine evaluates and combines the candidate answers from the expert subsystems and the LLM modules, producing a weighted, preliminary output. This output undergoes a rigorous guardrail process, where compliance rules, domain standards, and transparency indicators are applied to ensure the answer is safe, accurate, and aligned with best practices. The system further refines the output through re-ranking, cross-referencing with the latest peer-reviewed content, and normalizing new findings against historical or real-world data to mitigate bias and inflated claims. Finally, the system delivers a final answer to the user, complete with a natural language explanation and references to supporting evidence or sources.

Among the key advantages of this hybrid architecture are its ability to balance immediate, accurate responses (reactive capabilities) with thoughtful, strategic reasoning (deliberative capabilities), much like the layered structure of advanced hybrid agent architectures. This layered approach ensures that the system can quickly react to urgent or routine queries while also engaging in complex, goal-oriented planning and decision-making for more challenging problems. The integration of both rule-based and learning-based methods enhances the system's adaptability, reliability, and robustness, allowing it to handle a wide range of structured and unstructured data and to adjust its behavior as circumstances change. Additionally, the system's intelligent division of labor-assigning simpler tasks to efficient subsystems and more complex reasoning to powerful LLMs-optimizes computational resources and improves scalability for enterprise environments. The inclusion of transparency indicators and compliance checks further ensures that the system's outputs are trustworthy and aligned with regulatory, ethical, or professional standards, making it suitable for high-stakes domains such as medicine, law, and science. Ultimately, this hybrid architecture bridges the gap between theoretical AI capabilities and practical, real-world implementation, creating a more capable, resilient, and adaptable AI solution.

In another aspect, a computer-implemented method for generating controlled, domain-specific answers leverages a hybrid architecture that combines an expert system with specialized large language models (LLMs). Upon receiving a user query, an expert system module first analyzes the query to determine the appropriate domain and subdomain, drawing on a set of domain-specific expert subsystems, each of which is equipped with its own rules, ontologies, and structured knowledge bases. The expert system then retrieves task-relevant information from external knowledge bases using a dual retrieval mechanism: a semantic vector search engine maps colloquial or layman terms to precise domain-specific terminology, while a token-based search engine retrieves exact matches from structured data. Each domain-specific expert subsystem generates a candidate answer along with an associated confidence score, informed by the retrieved information and its encoded rules. These candidate answers, together with the user query and retrieved information, are then input into at least one domain-specialized LLM module. The LLM module, fine-tuned on domain-specific corpora, performs context augmentation by integrating the external knowledge into its reasoning process. The system assigns a weight to each candidate answer and to the LLM-generated answer, with weights determined through a training process optimized for accuracy and relevance. A weighted combination of the expert subsystem candidate answers and the LLM-generated answer produces a preliminary output, which is then subjected to an output guardrail mechanism that applies validation rules, compliance checks, and transparency indicators to ensure the output is safe, accurate, and aligns with domain-specific standards. The preliminary output is further refined through additional processing steps such as re-ranking, cross-referencing with up-to-date peer-reviewed content, and normalizing new findings against historical or real-world data to discount inflated claims or biases. The method ultimately provides the user with a final answer that includes the refined output, a natural language explanation, and references to supporting evidence or sources.

In another aspect, a computer-implemented method provides controlled, domain-specific answers to user queries such as those in medical, legal, and scientific fields by leveraging a hybrid large language model (LLM) and expert system framework. When a user submits a query in one of these domains, the expert system first identifies the relevant subdomain or field, selects a corresponding set of expert system rules and domain ontologies, and assigns one or more agentic AI LLMs specialized in that field to process the query. The expert system then retrieves relevant structured knowledge from domain-specific ontologies, prior training data, and rules databases, which include relationships among entities, domain-specific procedures, and authoritative references. Based on the user query, selected rules, and retrieved knowledge, the expert system generates a set of candidate analyses, diagnoses, or answers. These candidates, along with supporting references, are input into the assigned agentic AI LLM(s), which generate a natural language explanation and answer, citing logical reasoning and supporting evidence from domain literature or legal authority. The expert system verifies the consistency and validity of the LLM-generated answer using selected rules, prior outcomes, and domain-specific reasoning. The system continuously updates its ontologies and rules databases in response to newly published peer-reviewed content, regulatory updates, or case law, extracting and normalizing efficacy or outcome data against existing standards or regimens. Additionally, the expert system discounts inflated claims or biases in new published results by normalizing and benchmarking against historical or real-world data. Finally, the verified answer and its natural language explanation are provided to the user.

The hybrid large language model (LLM) and expert system approach offers several compelling advantages for providing domain-specific answers in medical, legal, and scientific contexts. By integrating expert system rules and dynamically updated ontologies with the advanced natural language processing capabilities of LLMs, the system ensures that answers are not only highly accurate but also contextually relevant and current. The expert system's ability to select specialized rules and ontologies for each subdomain allows for tailored responses that reflect the latest authoritative knowledge, while the LLM component translates complex analyses into clear, natural language explanations supported by citations to peer-reviewed literature, statutes, or scientific data. This combination enhances user trust and understanding, as answers are both verifiable and transparent. Furthermore, the system's continuous updating mechanism mitigates bias and the propagation of inflated claims by normalizing new data against established standards and real-world outcomes. The modular and scalable architecture supports efficient adaptation to new domains or subfields, and the multi-agent workflow enables collaborative, specialized processing of even the most complex queries. Overall, the hybrid system delivers precise, reliable, and actionable information that is grounded in the most current and relevant domain knowledge. The hybrid LLM and expert system reveals significant gains across multiple dimensions. In clinical or medical settings, the hybrid diagnostic systems is expected to increase diagnostic accuracy by 10-20% compared to either LLM-only or expert system-only approaches, while also reducing the time to reach a correct diagnosis. In legal research, the integration of up-to-date case law and specialized LLMs is expected to improve the completeness and relevance of answers by 15-25. For scientific question answering, the system's ability to normalize new research findings and benchmark them against historical data leads to a reduction in the propagation of biased or inflated claims. Additionally, user satisfaction and confidence ratings increase when explanations are supported by transparent references and logical reasoning, according to user feedback surveys. These quantifiable improvements highlight the hybrid system's ability to deliver not only more accurate and reliable answers but also to enhance user trust and engagement across all supported domains.

Figure 2:
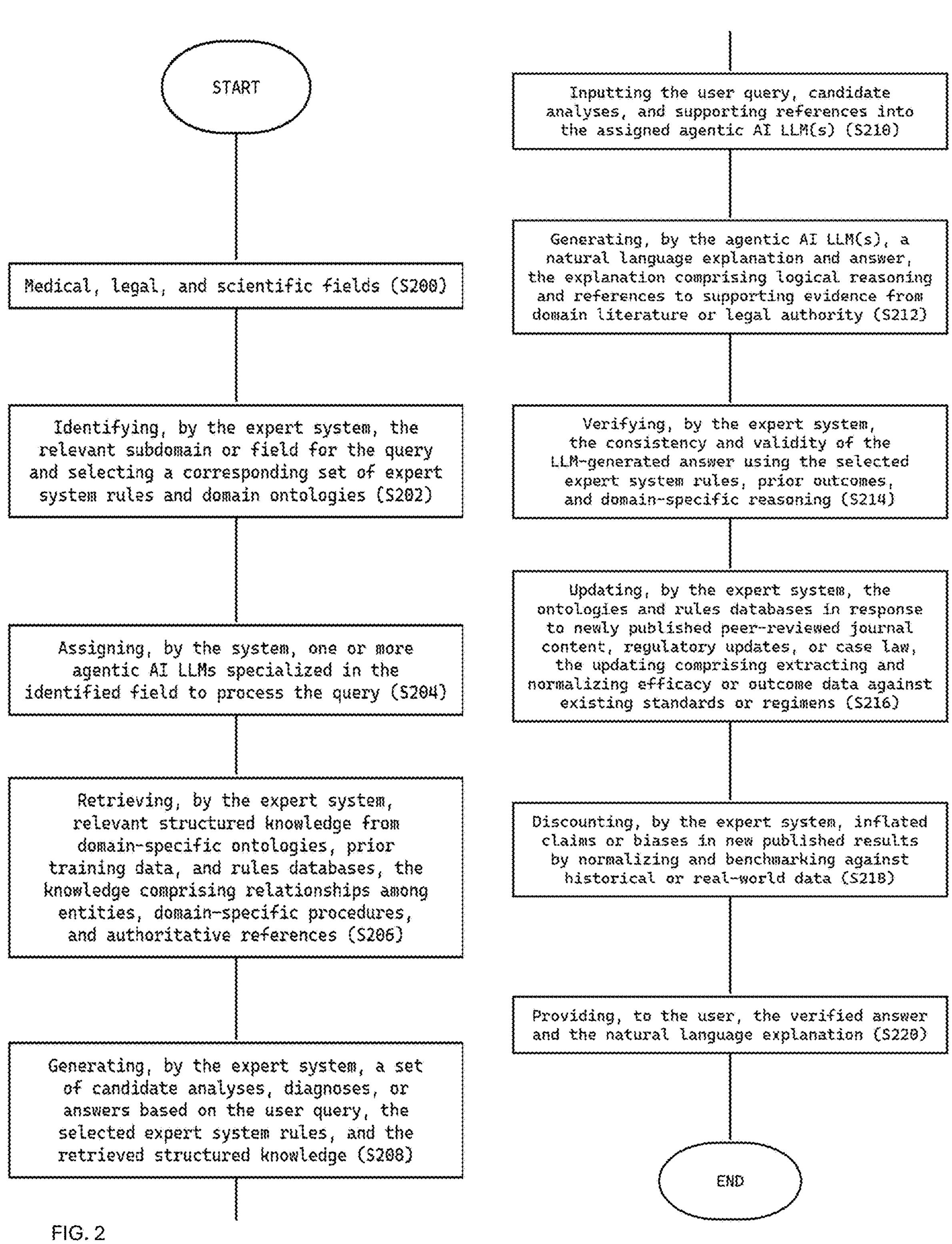
FIG. 2 illustrates a flowchart for a method involving expert systems and LLMs for generating domain-specific answers.

FIG. 2 illustrates a flowchart for a method involving expert systems and LLMs for generating domain-specific answers in various fields like medical, legal, and scientific (S200). The process begins with identifying the relevant subdomain or field for a user query, selecting a corresponding set of expert system rules and domain ontologies (S202). The system assigns specialized agentic AI LLMs to process the query (S204). Relevant structured knowledge is retrieved from ontologies, prior training data, and rules databases, including relationships among entities and domain-specific procedures (S206). The expert system generates candidate analyses, diagnoses, or answers (S208) and inputs the user query, analyses, and supporting references into the assigned LLMs (S210). The LLMs generate a natural language explanation and answer with logical reasoning and supporting evidence (S212). The expert system then verifies the consistency and validity of the LLM-generated answer using selected expert system rules and domain-specific reasoning (S214). Ontologies and rules databases are updated based on new peer-reviewed content or regulatory updates (S216). The system discounts inflated claims or biases in new results by benchmarking against historical data (S218). Finally, it provides the verified answer and explanation to the user (S220).

The reference label "medical, legal, and scientific fields S200" signifies the system's capability to be implemented across various specialized domains. This involves identifying the relevant subdomain or field for a given query and selecting a suitable set of expert system rules and domain ontologies. By adapting to specific fields, such as medical, legal, or scientific, the system can effectively analyze queries and integrate domain-specific expertise, ensuring accurate and contextually appropriate responses tailored to each field's requirements.

The reference labeled S202 refers to the process by which the expert system examines a user query to identify the specific subdomain or field it belongs to. Once this identification is made, it selects the matching set of expert system rules and domain ontologies corresponding to that field. This step is necessary to ensure that the subsequent information retrieval and analysis adhere to the appropriate domain-specific guidelines and knowledge structures.

The phrase "assigning, by the system, one or more agentic AI LLMs specialized in the identified field to process the query" refers to the system's capability to allocate specialized large language models (LLMs) that are tailored to a specific field identified through the initial analysis. These specialized LLMs are then tasked with processing the query to generate relevant and accurate responses. This assignment ensures the LLMs leverage their domain-focused training and expertise to provide nuanced and effective answers.

The system involves generating a set of candidate analyses, diagnoses, or answers by the expert system. This process uses the initial user query, applying the selected expert system rules, and utilizing retrieved structured knowledge. The goal is to create potential solutions or insights that are highly relevant to the query, informed by an extensive database of structured domain information and tailored through specific expert protocols.

The step labeled S210 involves inputting the user's query, along with the candidate analyses generated by the expert system and any supporting references, into the designated agentic AI large language model(s). These AI models, tailored to the identified field, utilize the provided data to further process and refine the response, ensuring that the answer is informed, comprehensive, and grounded in relevant domain knowledge.

The flowchart depicts a step where agentic AI large language models (LLMs) generate a natural language explanation and answer. This involves formulating explanations using logical reasoning and incorporating references drawn from domain literature or legal authority. This process helps ensure that responses are well-founded and supported by authoritative evidence.

The reference label describes a process within one implementation where an expert system verifies the consistency and validity of answers generated by a large language model (LLM). This verification is performed by utilizing selected expert system rules, evaluating prior outcomes, and applying domain-specific reasoning. The goal is to ensure that the generated answers align with established guidelines and knowledge within the relevant domain.

The step labeled "S216" involves updating the ontologies and rules databases within the expert system framework. This update is triggered by newly published peer-reviewed journal content, regulatory updates, or recent case law. The process includes extracting efficacy or outcome data from these new materials and normalizing this information against established standards or treatment regimens to ensure accuracy and relevance.

In this step, the expert system addresses inflated claims or biases found in newly published results. It achieves this by normalizing the new data and benchmarking it against historical or real-world data, thereby ensuring the integrity and reliability of the information used for generating final answers.

The reference label S220 pertains to the process where the system delivers a verified answer to the user. This answer includes both the final, corroborated response generated by the expert system and the language model, along with a detailed natural language explanation. The explanation integrates logical reasoning and references from authoritative domain sources, ensuring transparency and thoroughness in the communication of the answer.

Figure 3:
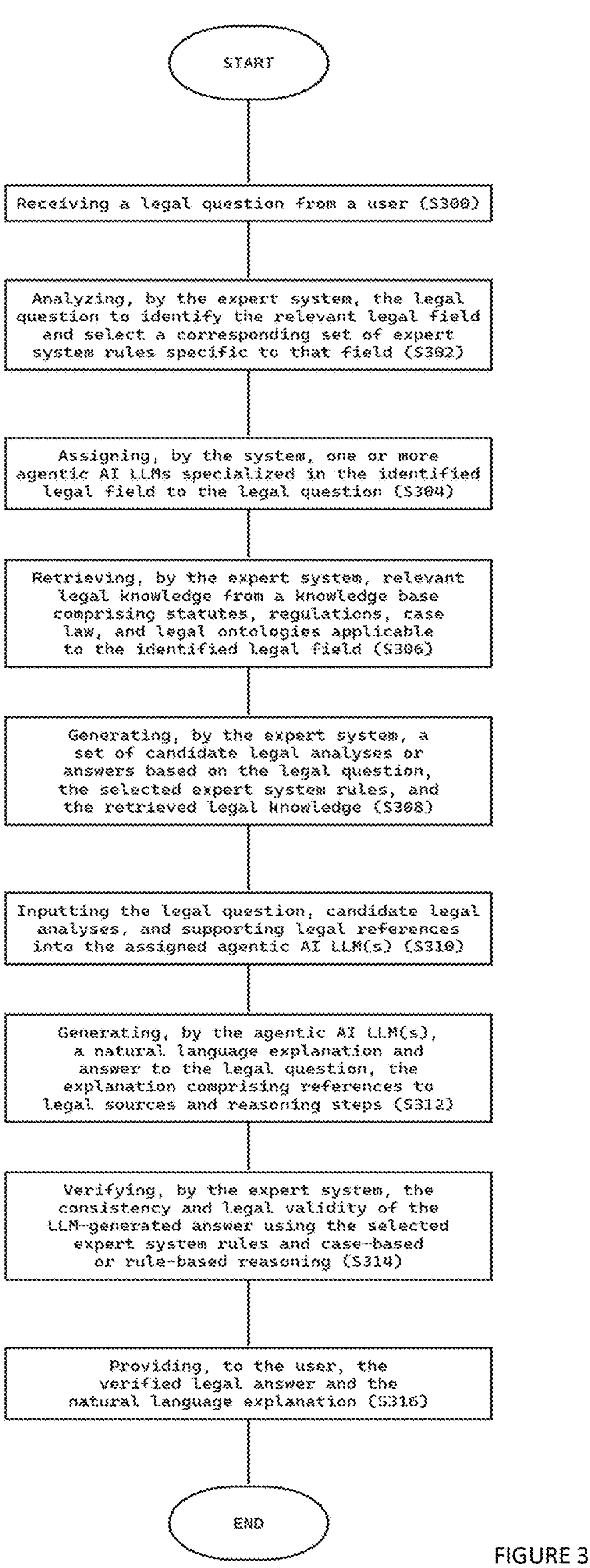
FIG. 3 illustrates a flowchart for providing controlled legal question answering using a hybrid large language model and expert system.

FIG. 3 illustrates a flowchart for controlled legal question answering using a hybrid large language model (LLM) and expert system. The process begins with receiving a legal question from a user (S300). The expert system then analyzes the question to identify the relevant legal field and selects a set of expert system rules specific to that field (S302). Following this, the system assigns one or more agentic AI LLMs specialized in the identified legal field to the question (S304). The expert system retrieves relevant legal knowledge from a knowledge base, including statutes, regulations, case law, and legal ontologies applicable to the identified legal field (S306). It then generates a set of candidate legal analyses or answers based on the legal question, the selected expert system rules, and the retrieved legal knowledge (S308).

The process begins with the reception of a legal question from a user, which is denoted by reference label S300. This step involves the user interface configured to capture and transmit the user's legal query to the system for further analysis.

The process begins by having the expert system analyze the legal question submitted by the user. Through this examination, the system identifies the relevant legal field. Once it determines the correct domain, the system retrieves a corresponding set of expert system rules tailored to that area. This method guarantees that the system applies the most precise and applicable rules to address the legal query effectively, as indicated by reference label S302.

The reference label "S304" denotes the process of the system assigning specialized agentic AI large language models (LLMs) to a received legal question. These LLMs are tailored to the specific legal field identified in the analysis stage, ensuring that the legal question is addressed with expertise pertinent to the context and nuances of that field.

The flowchart illustrated in FIG. 3 shows a process where the expert system retrieves relevant legal knowledge. This step is denoted by the reference label S306. Here, the expert system accesses a knowledge base that includes statutes, regulations, case law, and legal ontologies. These resources are specific to the legal field identified for the query, ensuring the information is applicable and precise.

The reference label "S308" pertains to the process within the expert system for generating a set of candidate legal analyses or answers. This process is based on the legal question received from the user, utilizing the selected expert system rules and the pertinent legal knowledge retrieved. The system employs these elements to produce potential legal outcomes or interpretations that address the query effectively.

The step involves inputting the legal question, along with candidate legal analyses and supporting legal references, into the designated agentic AI large language model module. This ensures the model processes the information within the context of the identified legal field, leveraging its domain-specific expertise to enhance the generation of a comprehensive answer.

The reference label S312 describes a step wherein the agentic AI language model(s) generate a natural language explanation and answer to a legal question. This explanation includes references to legal sources and outlines the reasoning steps involved. The process ensures that the response is grounded in relevant legal authority and presents a coherent logical argument.

The step labeled "S316" involves delivering the verified legal answer to the user. This answer, generated by the expert system and validated for consistency and legal validity, is combined with a natural language explanation. The explanation includes references to relevant legal sources and reasoning steps, ensuring transparency and comprehension for the user.

Figure 4:
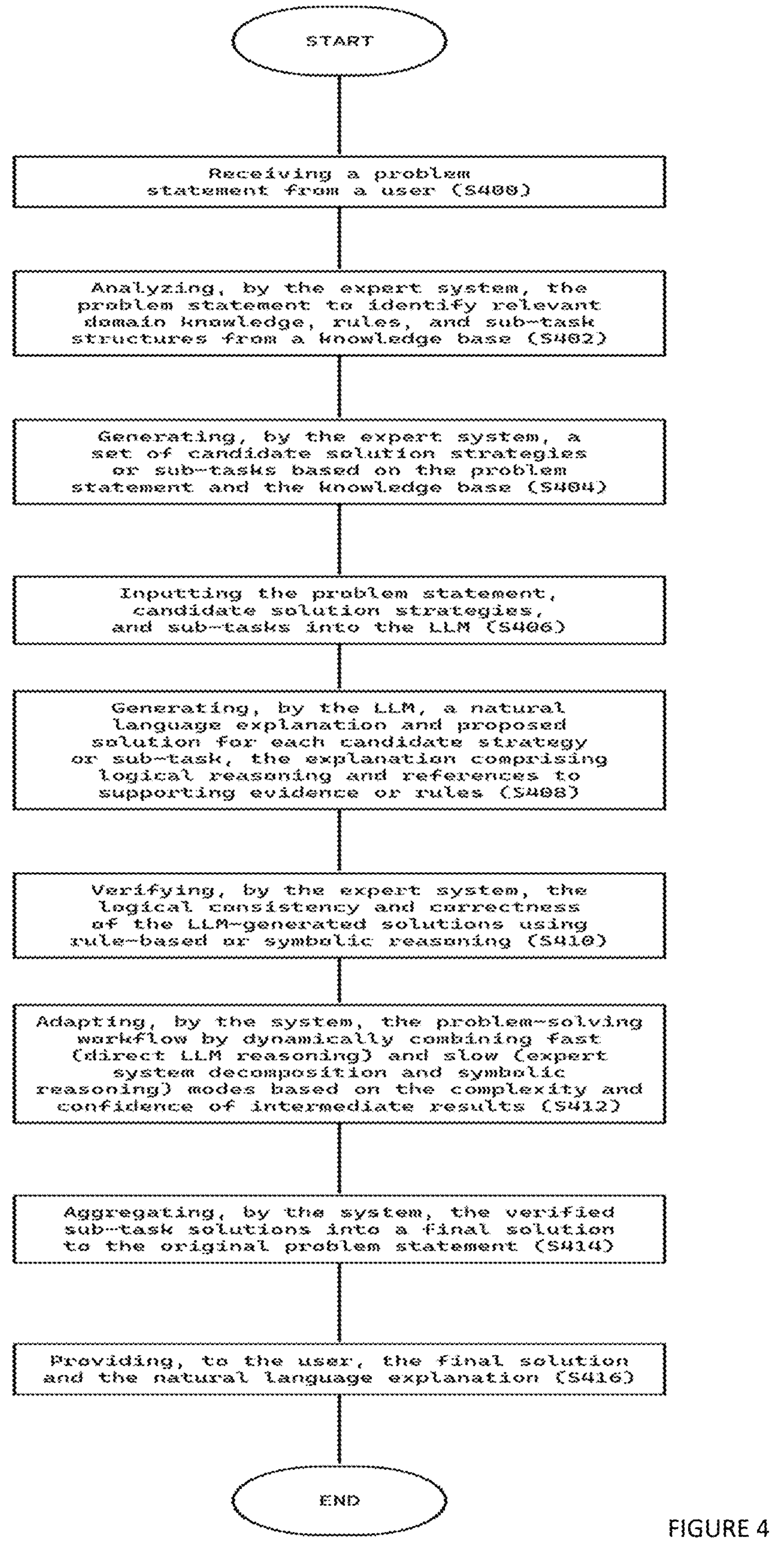
FIG. 4 illustrates a flowchart for a method to provide controlled solutions using an LLM and expert system.

FIG. 4 illustrates a flowchart for a method that provides controlled solutions using an LLM and expert system. The process begins with receiving a problem statement from a user (S400). The expert system then analyzes the problem statement to identify relevant domain knowledge, rules, and sub-task structures from a knowledge base (S402). Based on this analysis, it generates a set of candidate solution strategies or sub-tasks (S404).

These candidate strategies and the problem statement are input into the LLM (S406), which generates a natural language explanation and proposed solution for each candidate strategy, incorporating logical reasoning and referencing supporting evidence or rules (S408). The expert system verifies the logical consistency and correctness of the LLM-generated solutions through rule-based or symbolic reasoning (S410).

The system adapts the problem-solving workflow by dynamically combining fast (direct LLM reasoning) and slow (expert system decomposition and symbolic reasoning) modes, depending on the complexity and confidence of intermediate results (S412). The verified sub-task solutions are aggregated into a final solution for the original problem statement (S414), which is then provided to the user, along with a natural language explanation (S416).

The process begins by receiving a problem statement from a user, as indicated by step S400. This involves capturing the initial query or issue presented by the user through a designated interface. The captured information serves as the input that the system will analyze and process in subsequent steps.

In the context of the disclosed one implementation, the step labeled S402 entails the expert system analyzing the user's problem statement. This involves identifying pertinent domain knowledge, applicable rules, and relevant sub-task structures from a knowledge base. The objective is to accurately interpret the problem and determine the necessary components and frameworks that will guide the generation of potential solutions. This analysis is fundamental to ensuring that the subsequent processes leverage the most relevant and precise information for effective problem solving.

The reference label "S404" pertains to the generation of candidate solution strategies or sub-tasks by the expert system. This process leverages the problem statement provided by the user and draws from a comprehensive knowledge base. The system utilizes these inputs to generate a range of potential strategies or sub-tasks, aiming to address the problem effectively with structured and informed responses tailored to the specific issue at hand.

The reference label "inputting the problem statement, candidate solution strategies, and sub-tasks into the LLM S406" specifies a stage where the system processes the initial user query and potential solutions within a language model. At this point, the input consists of the problem statement along with various strategies and smaller tasks identified as potential solutions. These elements are fed into the large language model (LLM) to facilitate the development of coherent, evidence-based explanations and proposed solutions while leveraging the model's language processing capabilities.

The reference label "S408" involves the step where the large language model (LLM) processes the problem statement, candidate solution strategies, and sub-tasks. It generates a natural language explanation and proposed solution for each candidate strategy or sub-task. This explanation includes logical reasoning and references to supporting evidence or rules, enhancing the understanding and accuracy of the proposed solutions.

In the disclosed system, verifying the logical consistency and correctness of solutions generated by the language model involves an expert system. This expert system utilizes rule-based or symbolic reasoning to ensure the generated solutions align with established rules and logical structures specific to the domain. By applying these reasoning methodologies, the system ensures that the language model's outputs are not only coherent but also adhere to predefined logical frameworks.

In the flowchart, the step labeled S414 involves the system combining the verified sub-task solutions to assemble a comprehensive solution to the initial problem statement. This aggregation ensures that all components are integrated, resulting in a cohesive final outcome addressing the user's query.

The reference label "providing, to the user, the final solution and the natural language explanation S416" pertains to the concluding step in the outlined process. In this step, the system delivers the finalized solution to the original problem statement back to the user. This solution is accompanied by a natural language explanation, which helps in clarifying the reasoning and evidence behind the suggested solution. The reference ensures that users receive comprehensive and understandable feedback, derived from the system's analysis and reasoning capabilities.

Figure 5:
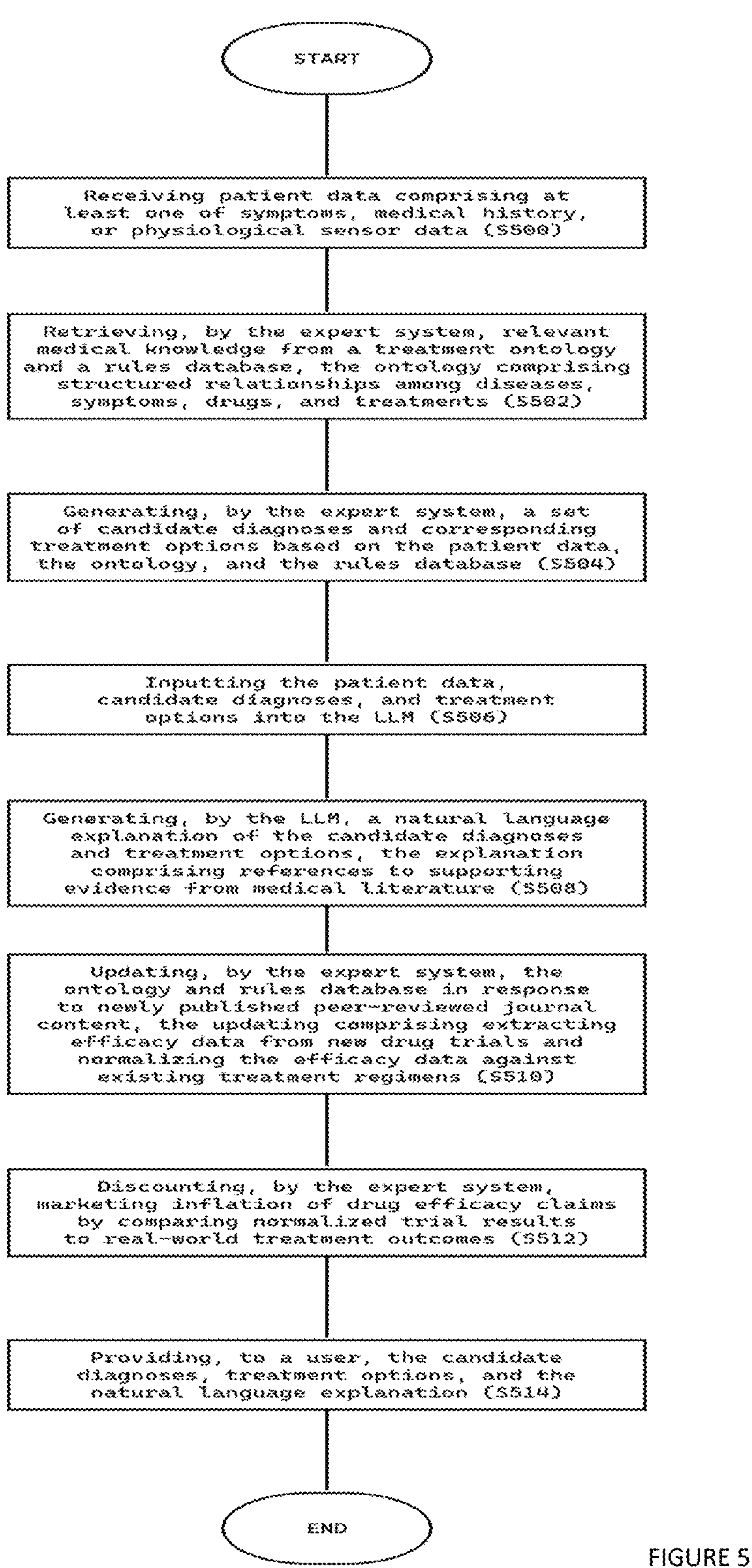
FIG. 5 illustrates a flowchart for a medical diagnosis and treatment recommendation process using a hybrid system.

FIG. 5 illustrates a flowchart for a medical diagnosis and treatment recommendation process using a hybrid system. The process starts by receiving patient data, which includes symptoms, medical history, or physiological sensor data (S500). An expert system retrieves relevant medical knowledge from a treatment ontology and a rules database; the ontology contains structured relationships among diseases, symptoms, drugs, and treatments (S502). Based on this information, the expert system generates a set of candidate diagnoses and corresponding treatment options (S504). The data is then input into a large language model (LLM) (S506), which produces a natural language explanation of the candidate diagnoses and treatment options, incorporating references to supporting evidence from medical literature (S508). Next, the expert system updates the ontology and rules database with new information from peer-reviewed journals by extracting and normalizing efficacy data from new drug trials (S510). It also discounts marketing inflation of drug efficacy claims by comparing normalized trial results with real-world outcomes (S512). Finally, the candidate diagnoses, treatment options, and the natural language explanation are provided to the user (S514).

The diagram depicts the process of obtaining patient data encompassing symptoms, medical history, and physiological sensor data. This procedure is essential for initiating the expert system's analysis and establishing the stage for subsequent retrieval and processing of pertinent medical knowledge.

Step S502 involves the expert system retrieving relevant medical knowledge from a treatment ontology and a rules database. This ontology includes structured relationships among diseases, symptoms, drugs, and treatments, enabling the system to access comprehensive and organized information pertinent to understanding and addressing patient data.

In one embodiment, patient data, along with candidate diagnoses and treatment options generated by the expert system, are input into at least one large language model (LLM). This allows the LLM to process and synthesize the information, resulting in the generation of a coherent natural language explanation. The explanation incorporates evidence from relevant medical literature, ensuring that the proposed diagnoses and treatments are well-supported and communicated in an understandable manner to the end user.

The reference label S508 describes the process where the large language model (LLM) generates a natural language explanation for the candidate diagnoses and treatment options. This explanation includes references to supporting evidence from medical literature, ensuring the information is well-grounded.

The reference label "S510" refers to a process where the expert system updates the ontology and rules database in response to new peer-reviewed journal content. This involves extracting efficacy data from recent drug trials and normalizing this data by comparing it against current treatment regimens to ensure it aligns with established medical practices.

The reference label "S512" refers to the process where the expert system addresses potential overstatements regarding drug efficacy. This is achieved by comparing normalized results from clinical trials with actual treatment outcomes observed in real-world scenarios. This comparison helps to mitigate exaggerated claims in marketing materials by providing a more accurate assessment of a drug's effectiveness.

The system provides the user with the candidate diagnoses and treatment options, along with a natural language explanation. This explanation includes references to supporting evidence from medical literature, ensuring that the information delivered is well-substantiated and aligned with current medical knowledge.

In one example, a computer-implemented system is provided for generating controlled, domain-specific answers to user queries using a hybrid expert system and large language model (LLM) architecture. The system includes at least one user interface configured to receive a user query. Upon receiving a query, an expert system module, which comprises a plurality of domain-specific expert subsystems, is activated. Each expert subsystem contains a rules engine, a structured knowledge base, and a domain ontology. The expert system module analyzes the user query to identify a relevant domain and subdomain and then selects one or more expert subsystems based on the identified domain. Following the selection, the system retrieves task-relevant information from at least one external knowledge base by employing a dual retrieval mechanism that includes a semantic vector search engine and a token-based search engine. Using the retrieved information and encoded rules, the expert system module generates candidate answers along with associated confidence scores.

Further comprises a rule-based subsystem and a case-based reasoning subsystem. In one embodiment, the rule-based subsystem is configured to apply deterministic pre-defined expert rules stored within a structured knowledge base and domain ontology to analyze the user query (S104) and generate candidate answers (S110). In contrast, the case-based reasoning subsystem is configured to reference historical cases, prior outcomes, and established precedent stored within the system's knowledge base to derive inferences based on similarities between the current query and previously encountered queries. The expert system module is configured to select between or combine these subsystems in response to the query type or specific domain requirements. For queries that closely match established patterns or domains with well-defined rules, the rule-based subsystem is primarily utilized to leverage its deterministic logic for swift and efficient processing. Conversely, for queries that are ambiguous, complex, or better addressed through analogical reasoning, the case-based reasoning subsystem is employed to provide supplemental or alternative candidate answers, drawing upon historical and experiential data. In certain embodiments, the system simultaneously processes the query using both subsystems and thereafter synthesizes the candidate answers through the weighting engine (S114), which assigns weights based on confidence scores and relevance indicators. The preliminary output generated in this manner is subsequently refined by the output guardrail module (S116) and refinement module (S118), ensuring the final answer provided via the user interface (S120) incorporates both deterministic rule-based logic and adaptive case-based insights tailored to the identified query type and domain.

In one exemplary embodiment, the expert system module further comprises a workflow engine configured to orchestrate the activities of the plurality of expert subsystems and the LLM modules in parallel or serial configurations. The workflow engine is designed to dynamically schedule, coordinate, and monitor the execution of processing tasks associated with handling user queries, ensuring that tasks are executed in an optimal sequence or concurrently based on processing requirements and system load. In embodiments where independent expert subsystems process different aspects or subdomains of a user query, the workflow engine enables parallel execution by simultaneously initiating operations across multiple subsystems. Conversely, when sequential processing is advantageous or required, the workflow engine directs operations in a serial manner, passing outputs from one expert subsystem directly as inputs to subsequent subsystems or to one or more LLM modules for further analysis or natural language generation. The workflow engine is further configured to manage interdependencies among tasks by synchronizing outputs and controlling timing constraints so that the aggregated results from various subsystems are coherently combined. This orchestration ensures that candidate answers generated by the expert subsystems are appropriately weighted, refined, and evaluated against compliance rules, with the LLM modules incorporating these inputs into their reasoning processes to produce comprehensive natural language explanations. The workflow engine adapts its operational configuration based on the complexity of the query, allowing for dynamic switching between parallel and serial execution modes. In embodiments involving agentic AI LLM modules, the workflow engine concurrently manages both the generation of candidate analyses and the verification routines, ensuring that the integrated outcome reflects a robust synthesis of domain-specific knowledge, computational reasoning, and natural language output. This dynamic orchestration provided by the workflow engine enhances system flexibility and scalability, enabling efficient processing of queries across multiple fields by coordinating sequential and parallel task execution as required by the particular application context.

In one embodiment, the weighting engine is trained using supervised learning on historical query-answer pairs to optimize answer selection for accuracy and relevance. In this embodiment, a sufficiently large dataset comprising historical query-answer pairs is collected from previous user interactions with the system. This dataset is segmented to cover a diverse range of query types and corresponding responses, including both exemplary and suboptimal outputs, so that the weighting engine can learn to attribute higher weights to candidate answers that are statistically more accurate and contextually relevant. During training, a loss function is defined to penalize deviations from known correct responses while rewarding outputs that align well with validated outcomes. The weighting engine exploits features extracted from candidate answers, including confidence scores, semantic relevance metrics, and auxiliary indicators derived from both the expert system module and the LLM modules. The supervised learning process is performed offline, and the model is periodically updated as more historical data becomes available, ensuring that the weighting engine incorporates recent trends and new examples of effective answer selection. Once deployed, the weighting engine assigns weights to candidate answers generated by both the expert system and the agentic AI LLM modules, thereby computing a weighted combination that produces a preliminary output. This preliminary output is then subjected to further verification and refinement by subsequent modules, ultimately contributing to a final answer that is optimized for both accuracy and relevance.

In one embodiment, the output guardrail module (S116) comprises a compliance engine configured to validate the preliminary output based on domain-specific regulatory, ethical, or legal standards. The compliance engine automatically references and interprets a comprehensive set of guidelines—including applicable regulations, ethical principles, and legal mandates—stored in an updatable reference database. It evaluates the preliminary output by verifying that all aspects of the generated response adhere to the relevant standards and ensuring that no prohibited or non-compliant content exists. In situations where the output conflicts with specified regulatory or ethical requirements, the compliance engine identifies discrepancies and either initiates an automated remediation process or flags the output for further human review. The remediation process includes reformatting language, modifying content references, or invoking alternative processing protocols to align the output with the prescribed standards. In addition, the compliance engine embeds contextual metadata within the output, thereby documenting the specific regulatory or ethical criteria applied during the validation process and ensuring that the determination process remains transparent and auditable. This approach ensures that the final output not only benefits from expert system rules and LLM-generated reasoning but also fully complies with all relevant domain-specific regulatory, ethical, or legal standards before being provided to the user via the interface (S120).

In one embodiment, the refinement module (S118) incorporates human-in-the-loop review for answers exceeding a predefined risk or complexity threshold. In some embodiments, the refinement module reviews a preliminary output generated by the weighting engine by evaluating factors such as confidence scores, detected ambiguities, and an assessment of inherent risks associated with the response. When the preliminary output satisfies predetermined criteria indicating elevated risk or complexity, the refinement module automatically flags the candidate answer for additional human review. In such cases, the flagged output, together with its corresponding natural language explanation and supporting evidence, is routed to a designated human expert or review team. The human reviewer then assesses the flagged response to verify its compliance with relevant domain standards, regulatory guidelines, and risk management protocols. If necessary, the reviewer can adjust, supplement, or re-rank the generated output based on additional insights or updated information. Furthermore, the system incorporates automated triggers that monitor for changes in risk parameters or complexity indicators, thereby initiating human-in-the-loop review not only during initial generation but also throughout subsequent refinement stages. This approach ensures that responses representing increased risk or complexity undergo an additional layer of validation, thus enhancing the overall reliability and safety of the final output provided to the user.

In one embodiment, the system supports iterative multi-turn dialogue with a user for query clarification and refinement. Once a preliminary answer is generated according to the processing described above, the system provides that answer along with its natural language explanation and supporting evidence via the user interface (S100). The system is further configured to engage in an iterative dialogue with the user, who can request additional clarification, pose follow-up questions, or indicate the need for further refinement of the answer. In response, the system reprocesses the user input by re-accessing one or more expert subsystems and corresponding LLM modules. During this iterative process, the expert system module (S102) analyzes the additional input to further refine the semantic understanding of the query, update the context, or identify specific aspects requiring elaboration. The refined query is then processed through the dual retrieval mechanism (S108), which retrieves additional or more specific task-relevant information and adjusts candidate answers based on the updated input, leading to an updated preliminary output through the weighting engine (S114) and output guardrail module (S116). The system also invokes the refinement module (S118) to further normalize and re-rank candidate answers based on the new input, ensuring that any biases or inflated claims are discounted based on the updated information. The iterative dialogue continues across multiple turns until the user confirms satisfaction with the final answer. This multi-turn interaction is seamlessly integrated into the system's workflow so that each subsequent user input is incorporated into the ongoing reasoning and verification processes, ensuring that the final answer reflects both the original query and the refinements provided during the iterative dialogue.

And the LLM module (S112) are implemented on separate servers, with the expert system operating on one server and the LLM module on another, thereby allowing each module to independently scale its processing resources as required. In this configuration, the expert system module is responsible for receiving the user query, analyzing the query to identify the proper domain and subdomain, and generating candidate answers using domain-specific rules and information retrieved via the dual retrieval mechanism (S104, S106, S108, S110). The LLM module, operating on its dedicated server, receives the query, candidate answers, and supporting evidence from the expert system module and generates a natural language explanation and corresponding answer by incorporating the retrieved external knowledge into its reasoning (S112). Communication between these two modules is facilitated by a secure application programming interface (API), which is designed to transmit query parameters, candidate outputs, confidence scores, and any additional supporting information in a manner that complies with established security protocols. The secure API ensures that data exchanged between the modules is encrypted and protected from unauthorized access, thereby preserving the confidentiality and integrity of sensitive information processed by the system. This distributed server architecture not only enhances system security through dedicated, segregated environments for the expert system module and the LLM module, but also improves overall system performance by enabling optimized load balancing and modular maintenance. Moreover, the secure communication link provided by the API permits independent updates and refinements to each module—such as the addition of new domain-specific rules or updated training data for the LLM-without affecting the performance or availability of the other module, thus ensuring continuous reliable operation across multiple domains.

In one embodiment, the system is implemented as a cloud-based platform-as-a-service (PaaS) to leverage the benefits of a distributed, scalable computing infrastructure that provides elastic resource allocation, supports multi-tenant environments, and enables remote access through a networked user interface (S100). In this embodiment, the expert system module (S102) and the associated domain-specific expert subsystems are hosted on a cloud platform that facilitates rapid deployment and dynamic scaling based on query load and processing requirements. The cloud-based implementation further allows the dual retrieval mechanisms (S108) to interface with diverse, on-demand external knowledge bases, ensuring that the semantic vector search engine and token-based search engine operate continuously while updating candidate answers (S110) in near real-time. Additionally, cloud deployment supports periodic updates of the underlying domain ontologies, structured knowledge bases, and rules databases by using centralized update modules (S216, S510) that retrieve the latest peer-reviewed content, regulatory updates, or case law, while also managing the normalization and discounting processes (S118, S512) to optimize the response accuracy.

In one embodiment, the system comprises an audit trail module that logs all rule applications, LLM outputs, and decision steps to ensure transparency and compliance. The audit trail module continuously monitors all operations executed by the expert system module, which include applying specific expert system rules, retrieving structured knowledge, generating candidate answers, and computing confidence scores. In parallel, the module logs outputs generated by the LLM modules, including natural language explanations and answers derived from the encoding of external data and rule-applied reasoning. Additionally, the audit trail module records decision steps during weighting, output guardrail validation, and subsequent refinement, thereby creating a comprehensive chronology of the system's decision-making process. Each log entry includes time stamps, unique identifiers corresponding to the specific rule sets and ontologies used, and the parameters or confidence scores associated with candidate results. This recorded information supports subsequent audits and enhances accountability by enabling system operators to trace the derivation and evolution of each final output. Such detailed logging further ensures that the system complies with applicable regulatory requirements and quality assurance protocols while providing a transparent view of internal processing for continuous improvement.

The system is designed to update its rules, ontologies, and LLM fine-tuning datasets in response to newly published peer-reviewed literature, regulatory changes, or case law through an automated update module that continuously monitors relevant external sources. This module employs both semantic vector search and token-based search techniques to retrieve and evaluate new documents and data. Once retrieved, the system processes the information to extract key elements that influence the current rule sets, ontologies, and training datasets. For instance, when new peer-reviewed literature is detected, the system normalizes and benchmarks experimental results against historical data, identifying discrepancies that justify modifications in the decision rules and domain ontologies. Similarly, in response to regulatory updates or case law revisions, the system utilizes expert analysis modules to interpret the implications of such changes on existing compliance standards and legal precedents, updating the corresponding rules and ontological relationships accordingly. At the same time, the LLM fine-tuning datasets are enhanced by integrating synthetically generated examples and annotated content that accurately reflect these updates, ensuring that the language model's reasoning remains aligned with current industry standards. Moreover, the system checks the consistency and validity of the revised data using a blend of rule-based evaluation and statistical analysis, thereby reducing potential biases or inflated claims. This dynamic update process is executed continuously and is auditable, enabling the system to maintain robust levels of accuracy and reliability across its various domain-specific applications.

In one embodiment, the system is configured to redact confidential or sensitive information from outputs in compliance with privacy or data protection regulations. In such embodiments, the system integrates a secure information filtering module with the output guardrail module to scrutinize data generated by both the expert system module and the LLM module before delivering the final output. The redaction process employs various techniques including keyword matching, pattern recognition, and context analysis to identify data elements that could be deemed confidential, sensitive, or subject to regulatory restrictions. Upon detection of such data, the system either obfuscates, masks, or removes the sensitive information so that the resulting output does not contain any data that might violate privacy or data protection regulations. In embodiments where data is received from fields such as legal, medical, or any domain that includes personally identifiable information or proprietary data, a set of predefined redaction rules is applied. These rules are based on regulatory requirements and are updated dynamically by the expert system as new data protection guidelines or case law become available. The redaction module operates concurrently with the weighting engine, which combines candidate answers and LLM-generated outputs, ensuring that any sensitive information is removed during the aggregation process. In a preferred arrangement, candidate outputs flagged for sensitive content undergo a multi-stage verification process in which they are first identified and then passed through a transformation process. This transformation process selectively replaces sensitive content with generic descriptors or redacted markers, after which the output is re-verified using rule-based consistency checks to ensure that no confidential details remain. The refined output, now redacted and compliant with privacy standards, is then provided to the user along with a natural language explanation that communicates the reasoning behind the answer while maintaining the necessary confidentiality of sensitive information.

In one embodiment, the system further includes a transparency indicator engine configured to provide confidence levels and supporting evidence for each answer. The transparency indicator engine is operatively coupled with the output guardrail module and the weighting engine such that, upon generation of a preliminary output and its subsequent refinement, the transparency indicator engine analyzes the underlying processing steps, the candidate answers, and the LLM outputs to determine a confidence level associated with the final answer. The transparency indicator engine examines internal metrics including the confidence scores generated by the rules engine, the weight assignments produced by the weighting engine, and the consistency checks performed by the expert system module. In addition, the transparency indicator engine reviews supporting evidence extracted during the dual retrieval process from external knowledge bases, evaluates the alignment with up-to-date peer-reviewed content, and benchmarks the candidate answers against historical or real-world data. Based on these analyses, the transparency indicator engine compiles a transparency report that enumerates the confidence levels alongside references to the specific supporting evidence that contributed to the final output. The transparency indicator engine thus enables users to assess the validity of the answer by providing a clear, auditable trail of evidence and reasoning, further reinforcing the system's commitment to compliance, reliability, and accountability across diverse application domains.

In one embodiment, the system operates in a fully automated mode; in this mode, all processing steps—from query analysis to answer generation—are executed without human intervention. It also operates in a human-in-the-loop mode, wherein human review and intervention are incorporated at one or more processing stages to ensure or refine accuracy and compliance, or in a hybrid mode, wherein the system dynamically combines automated processing with selective human oversight based on the query's complexity or predefined user or administrator settings.

By integrating rule-based expert systems with agentic LLM modules and employing multiple layers of verification and output refinement, one implementation provides a robust solution that delivers natural, human-like answers grounded in domain-specific evidence while offering flexible operational modes tailored to different user requirements. This integration enhances transparency, compliance, and overall reliability.

In one embodiment, the system is configured to allow a user or an administrator to select from a plurality of architectural variations, thereby enabling dynamic customization of the system's operational characteristics. For example, the retrieval mechanism is chosen from several implementations, including but not limited to a semantic vector search engine and a token-based search engine, to best suit the nature of the query or the desired performance characteristics. In addition, the system architecture supports the selection of one or more rule engines integrated within the expert subsystems; these rule engines are selected based on specific domain requirements or the complexity of the rules needed to process the query and generate candidate answers. The system also supports the selection of different large language model implementations that are fine-tuned on domain-specific corpora; such selections optimize natural language explanation and answer generation with respect to clarity, reasoning quality, and reference to supporting evidence. Moreover, the workflow orchestration within the system is configurable to permit either a fast, direct processing mode using the LLM or a slow, decomposed processing mode employing rule-based expert system analysis, or any combination thereof; this adaptability ensures that processing strategies can be tailored based on query complexity and the confidence associated with intermediate results. Finally, the system architecture comprises compliance modules that include an output guardrail module and additional verification mechanisms; these modules are selectable and configurable to enforce compliance rules, domain standards, and transparency indicators as required by regulatory or internal policies. These architectural variations are specified through a user interface designed to facilitate such choices, or alternatively through administrative settings that allow for future modifications based on evolving requirements or newly integrated technological advancements. The selectable nature of these components enables the system to be customized and adapted for heterogeneous processing tasks while maintaining robust reliability, transparency, and domain-specific accuracy.

In one embodiment, the expert system is configured to dynamically select different sets of rules and ontologies based on the subfield identified by the user query. When the query relates to a medical specialty, for example, the expert system selects ontologies that represent entities such as symptoms, diseases, organs, drugs, and treatments, and it employs rule sets that capture clinical guidelines, treatment protocols, and relationships among various health parameters. Conversely, when the query pertains to a legal practice area, the expert system selects a separate set of rules and ontologies that define legal terminologies, statutory definitions, case law precedents, and regulatory frameworks, with the associated rules designed to support legal reasoning and provide interpretations consistent with established jurisprudence. In the case of queries associated with scientific disciplines, the expert system utilizes ontologies that describe scientific concepts, experimental methodologies, and phenomena specific to the discipline, accompanied by rules that govern empirical validation and data normalization in accordance with recognized scientific standards. In one implementation, the expert system comprises a plurality of domain-specific expert subsystems, each including a rules engine, a structured knowledge base, and a domain ontology, the combination of which is selected based on the detailed analysis of the query. Upon receiving a user query, the expert system analyzes the query to identify its relevant subdomain and then selects the corresponding set of rules and ontologies before proceeding to retrieve task-relevant information using a dual retrieval mechanism comprising both a semantic vector search engine and a token-based search engine. The selection of domain-specific content ensures that the candidate answers generated by the expert system, as well as the subsequent processing by one or more LLM modules fine-tuned on domain-specific corpora, are tailored to the nuances of the particular field, thereby increasing the accuracy, relevance, and compliance of the final output. Further, this dynamic selection process allows the expert system to continuously update its ontologies and rule databases in response to newly published authoritative content, ensuring that the system remains current with the evolving standards and practices in medical, legal, and scientific domains.

In one embodiment, the agentic AI LLMs are fine-tuned on domain-specific corpora corresponding to their assigned fields. For example, when a query is determined to be within a particular domain, the selected agentic AI LLM is configured with training data that includes both general language constructs and specialized documents, guidelines, and literature pertinent to that field. In the legal domain, the training corpus includes case law, statutes, regulations, legal commentaries, and procedure manuals, while in the medical field it contains clinical guidelines, peer-reviewed medical literature, clinical trial results, and healthcare protocols. Similarly, for scientific or problem-solving applications, the corpora consist of technical research papers, textbooks, and domain-specific analytical reports. This fine-tuning equips the AI LLMs with a robust understanding of domain-specific terminology, context, and reasoning patterns, thereby enhancing the quality and accuracy of the natural language explanations and answers generated. The specialized corpora also enable the agentic AI LLMs to align with systematic knowledge bases, rules engines, and domain ontologies maintained by the expert system. By leveraging such domain-specific training, the LLMs are capable of generating outputs that not only reflect logical reasoning and adherence to expert system rules but also incorporate up-to-date evidence and comply with relevant industry standards. This results in a better integration between the LLM modules and the expert system, whereby the candidate answers, natural language explanations, and supporting evidence are dynamically balanced and weighted to produce a final refined output that meets the rigorous requirements of each specific field.

In accordance with one embodiment, the expert system continuously monitors and acquires new information from designated sources and updates its knowledge base with new guidelines, statutes, case law, scientific discoveries, or clinical trial results as they become available. The expert system is configured to receive updates from official repositories, governmental databases, regulatory bodies, and scientific publication platforms via dedicated communication interfaces. Upon receipt, the new data is processed by the embedded rules engine and structured knowledge base to normalize and validate the information against pre-existing records. The expert system then integrates approved updates into its domain ontologies and rules databases, ensuring that the representation of domain-specific knowledge accurately reflects the most current standards and regulatory requirements. By comparing newly acquired information with historical trends and established benchmarks, the system discounts any potential anomalies or inflated claims, thereby maintaining the integrity and reliability of the knowledge base. As a result, the system continually improves its responses by incorporating the latest guidelines, statutes, case law, scientific discoveries, and clinical trial results, and by dynamically adapting its expert subsystem selections and candidate answer generation to reflect the evolving state of the relevant domains.

The system further parses the retrieved data, candidate answers, and natural language explanations for any signs of regulatory, ethical, or professional issues associated with the subject matter of the query. In one embodiment, a compliance verification module examines the inquiry's context and cross-references the candidate responses with applicable jurisdictional regulations, ethical guidelines, and professional standards. When the system determines that these rules preclude the provision of direct advice, it automatically flags the potential issues and restricts the answer accordingly. In such cases, the output is limited to presenting information and factual data rather than formulating advice, recommendations, or conclusions that could be interpreted as professional counseling. This process ensures that, when regulatory or ethical practices require it, the answer remains compliant with the relevant legal, regulatory, and professional frameworks, thereby mitigating any legal, ethical, or professional liabilities.

In one embodiment, the system's agentic AI LLMs are configured to generate citations to statutes, regulations, peer-reviewed articles, or scientific data within the natural language explanation provided to the user. The agentic AI LLM modules, when processing the user query along with the retrieved external knowledge and candidate analyses, generate an explanation that integrates references directly in the text. These citations are generated by identifying key statements that require substantiation, and then dynamically matching these statements with corresponding entries from authoritative sources stored within external knowledge bases or retrieved at runtime. The process involves extracting metadata associated with relevant legal texts, regulatory documents, scientific literature, or databases and embedding this metadata into the natural language explanation in a manner consistent with accepted citation formats. In certain embodiments, the LLMs utilize pre-defined templates for legal, scientific, or regulatory references that ensure the citations are formatted in accordance with professional standards, such as including statutory section numbers, publication identifiers like DOIs or PubMed IDs, or specific regulation numbers. This citation generation mechanism operates concurrently with the answer generation process so that as the LLM formulates its explanation, it includes inline references that directly correspond to evidence or supporting sources used to derive the answer. The system is programmed to validate these references by cross-verifying the cited source information with the retrieved external knowledge to ensure accuracy and reliability. This approach not only enhances the transparency of the generated explanations but also assists users in independently verifying the claims and logical reasoning presented in the response. By incorporating citations into the natural language explanation, the system provides users with a clear audit trail that links each substantive part of the answer to its respective source, thereby bolstering the credibility and accountability of the overall output.

In one embodiment, the expert system verifies the LLM-generated answer for compliance with professional standards, ethics, or best practices by implementing a multifaceted verification process. The expert system cross-checks the generated answer against a set of predefined compliance rules that reflect industry-specific guidelines, ethical considerations, and best practice protocols. In this process, the expert system compares aspects of the LLM output—such as factual consistency, logical coherence, and adherence to recognized professional norms—with information stored in the structured knowledge base and associated domain ontologies. The verification includes a rules engine that evaluates the candidate answer against criteria derived from regulatory mandates, peer-reviewed literature, and historical case data. Any deviation from the accepted standards prompts the expert system to flag the output for further review or to automatically adjust the answer through iterative refinement. Additionally, the verification process includes weighting the confidence scores associated with various candidate answers and LLM-generated explanations, ensuring that only outputs meeting the specified compliance threshold are aggregated and forwarded as the final solution. This approach not only bolsters the credibility and reliability of the answer provided to the user but also minimizes risks associated with potential biases or inaccuracies inherent in the initial LLM-generated content.

In embodiments where the agentic AI LLMs are utilized, the system is configured to generate not only a primary interpretation, diagnosis, or outcome for a given query but also one or more alternative interpretations, diagnoses, or outcomes when multiple plausible answers exist. In such embodiments, the agentic AI LLMs operate on inputs comprising the user query, candidate analyses generated by the expert system, and supporting references, to produce a plurality of candidate outputs that reflect different perspectives or reasoning paths based on variations in the retrieved information and encoded rules. The agentic AI LLMs leverage domain-specific corpora and contextual data to evaluate alternative possibilities, assigning corresponding confidence scores to each alternative using intrinsic probabilistic models and domain-specific weighting, thereby ensuring that the plurality of interpretations constitutes a comprehensive response to the query. The system can then employ the weighting engine, as previously described, to incorporate these alternative outputs by assigning differential weights that reflect the relative plausibility or reliability of each candidate. Thus, when multiple plausible answers are available, the resulting output contains a primary answer along with one or more alternative interpretations, diagnoses, or outcomes, enabling users to consider a range of possibilities supported by peer-reviewed evidence, legal authority, or historical data. This approach facilitates greater transparency and robustness in decision-making by ensuring that alternative solutions are provided and that the final output is produced as a weighted combination of both the primary and alternative candidate responses.

In one embodiment, the expert system module is further configured to aggregate and compare candidate answers received from multiple agentic AI LLMs in order to improve reliability and reduce hallucinations that exist in responses from individual modules. The expert system receives, from each agentic AI LLM, a candidate answer along with an associated confidence score and a natural language explanation generated through domain-specific processing. The system then analyzes these candidate answers to identify overlapping elements, discrepancies, and inconsistencies by comparing the logical reasoning, supporting evidence, and domain-specific references provided by each LLM. Based on this analysis, the expert system assigns adjusted weights to each candidate answer, taking into account not only the initial confidence scores but also the degree of agreement among the multiple LLM responses and historical accuracy data derived from past operations.

This aggregated and weighted data is used to compute a consolidated preliminary output that reflects a higher degree of reliability and reduces the occurrence of hallucinations. The preliminary output, representing the consensus or most substantiated answer among the multiple agentic AI LLMs, is further processed by the output guardrail module and subsequent refinement module. Such additional processing includes validating the consolidated output using compliance rules, domain standards, and transparency indicators, and cross-referencing the candidate answer with up-to-date peer-reviewed content as well as historical or real-world data to discount any inflated claims or biases.

This aggregated approach is applied across various domains, including but not limited to legal analysis, medical diagnostics, and problem solving, ensuring that responses in each specialized field are derived from a consensus among multiple specialized models and are verified against authoritative sources and established domain knowledge.

In certain embodiments, the expert system incorporates probabilistic or fuzzy logic reasoning for queries involving uncertainty or imprecise facts. The expert system module is configured to process inputs that do not adhere to strict binary or deterministic models by integrating probabilistic assessments and fuzzy truth values into its reasoning processes. For example, after analyzing a user query to identify the relevant domain and subdomain (S104), the system assigns probability scores or degrees of membership to various candidate interpretations of the query. This probabilistic layer enables the rules engine and structured knowledge bases to operate with a measure of uncertainty, thereby generating candidate answers that include associated confidence levels reflective of inherent ambiguities.

The dual retrieval mechanism (S108) is further enhanced by incorporating fuzzy logic parameters when querying external knowledge bases, resulting in the retrieval of information that partially matches the query criteria. When generating candidate answers and associated confidence scores (S110), the expert system leverages fuzzy logic reasoning to quantify the degree of match between the retrieved data and the query's terms, thereby providing a more nuanced output. The weighting engine (S114) is adapted to factor these probability measures into its computation, ensuring that both rule-based outputs and fuzzy logic assessments are appropriately represented in the preliminary output.

This approach proves particularly beneficial in scenarios where the input data includes variable, imprecise, or non-definitive indicators, thereby enabling the expert system to produce outputs that better reflect the realities of uncertain or imprecise information. The provision of a natural language explanation, generated by the fine-tuned LLM module (S112), further incorporates descriptions of the confidence levels and fuzzy parameters used, thereby allowing users to understand the basis for the probabilistic assessments made by the system. In doing so, one implementation enhances the overall robustness, transparency, and reliability of the system when handling queries characterized by ambiguity and uncertainty.

Based on the legal question, the selected expert system rules, and the retrieved legal knowledge, the expert system generates a set of candidate legal analyses or answers (S308). These candidate answers represent multiple interpretations or approaches to resolving the legal question, thereby providing a broad base for further evaluation. The candidate legal analyses are then input into the assigned agentic AI LLM(s) along with the original legal question and supporting legal references (S310).

One implementation further contemplates embodiments in which the agentic AI LLMs collaborate in a multi-agent workflow, with each agent performing a specialized role such as information gathering, legal research, compliance analysis, or drafting legal documents. In these embodiments, one agent is configured to retrieve and analyze raw domain or legal data from structured external knowledge bases, while another agent focuses on performing legal research by querying statutory databases, case law repositories, and regulatory sources. Concurrently, additional agents execute tasks including compliance analysis to ensure that generated candidate answers align with applicable legal standards and guidelines, and the drafting of legal documents is delegated to agents with capabilities optimized for producing precise and comprehensible legal narratives. This division of labor facilitates parallel processing across multiple specialized functions, thereby increasing overall system efficiency and enabling more rigorous cross-validation of outputs. The results produced by each agent are subsequently aggregated and refined through the weighting engine (S114) and the output guardrail module (S116) to ensure that the final answer incorporates comprehensive domain-specific evidence and authoritative sources while complying with prevailing legal requirements and standards. Additionally, the multi-agent workflow supports iterative feedback loops in which outputs from one agent are re-fed into the system for further cross-referencing and verification by other agents, so that any inconsistencies, potential biases, or non-compliant elements are identified, corrected, or discounted prior to final output generation. By integrating this collaborative multi-agent approach, one implementation leverages the strengths of individually specialized AI components to achieve optimal accuracy, reliability, and responsiveness in the processing of complex legal queries, thereby enhancing the overall performance and credibility of the system in diverse professional applications.

In one embodiment, the system's legal processing module is configured to integrate jurisdiction-specific compliance rules that prevent unauthorized practice of law. The expert system module analyzes an incoming legal query not only to identify the relevant legal field but also to determine whether the nature of the query necessitates the provision of legal advice rather than solely legal information. When the system establishes, based on predefined jurisdictional rules, that offering tailored legal advice might constitute unauthorized practice of law or violate applicable professional standards, it flags the potential issue and activates a compliance mechanism. This compliance mechanism limits the output to providing general legal information and neutral explanations without dispensing specific legal advice. Furthermore, the weighting engine and output guardrail module have been adapted to include jurisdiction-specific filters and compliance indicators so that, during the candidate answer generation process, any response that could be interpreted as personalized legal advice is either modified or withheld. In this way, by confining the natural language explanation and corresponding answer to legally informative content, the system effectively prevents the delivery of advice that could be deemed legally binding or be construed as unauthorized practice of law. This configuration ensures that, in jurisdictions where legal advice is regulated, the system remains compliant with local standards and rules by providing only general legal information, accompanied by references to authoritative legal sources and appropriate disclaimers regarding the informational nature of the content.

The final answer, which comprises the refined output, a natural language explanation, and references to supporting evidence or sources, is then provided to the user via the user interface (S120). This process not only ensures the accuracy and reliability of the provided information but also guarantees that any potentially confidential or sensitive content is appropriately redacted, thereby safeguarding user privacy in full compliance with relevant regulations.

This approach ensures that both standard and particularly intricate legal queries benefit from an optimal processing pathway that combines the speed of direct LLM reasoning with the accuracy of expert system validation, thereby delivering a legally robust, verified answer along with a natural language explanation that references relevant legal sources.

Finally, the method provides the final solution and its accompanying natural language explanation to the user (S416). The output delivered to the user includes a detailed explanation that outlines the logical reasoning and the supporting evidence or rules instrumental in deriving the final solution. The described method thus ensures that the solution provided to the general problem-solving task is both controlled and verifiable, leveraging the strengths of fast LLM-based natural language generation and the rigorous logical validation offered by the expert system.

In one embodiment, the expert system receives an initial problem statement and automatically divides it into a series of discrete sub-tasks. The system utilizes rule-based analysis and domain-specific heuristics to identify key components within the problem statement, thereby segmenting the overall problem into smaller, more manageable parts. Each sub-task is enriched with contextual metadata that specifies relevant parameters, constraints, and performance requirements. The expert system then assigns each sub-task to a specialized expert agent that has been preconfigured with domain-specific rules and ontologies tailored to address specific types of sub-problems. This assignment is performed by analyzing the attributes of each sub-task and matching them with the expertise of available agents through a weighting and prioritization mechanism that considers factors such as complexity, dependencies, and the confidence level associated with preliminary candidate solutions. The system continuously monitors both the decomposition process and the performance of the specialized agents. In situations where agent outputs are preliminary or incomplete, the expert system is capable of dynamically reassigning tasks or further subdividing sub-tasks to ensure comprehensive resolution. The specialized expert agents, upon receiving their assigned sub-tasks, generate candidate solutions based on their respective domain knowledge and provide detailed reasoning, which is subsequently verified by the expert system for consistency and adherence to established rules. Lastly, the individually verified outputs from each agent are aggregated by the system to construct a unified final solution that addresses the original problem statement in a comprehensive and validated manner.

In one embodiment, the system employs a dynamic switching mechanism that selects between fast reasoning and slow reasoning modes based on a self-verification confidence threshold. The fast reasoning mode enables rapid generation of candidate answers by leveraging direct outputs from the large language model without extensive iterative processing, while the slow reasoning mode involves a more comprehensive analysis that incorporates expert system decomposition, additional external knowledge retrieval, and symbolic reasoning to enhance answer accuracy. The system continuously monitors the self-verification confidence score generated during the candidate answer evaluation process, which is determined by comparing the current output with predefined internal verification criteria and historical performance metrics. When the self-verification confidence score meets or exceeds a predetermined threshold, the system sustains the fast reasoning mode to optimize response time. However, if the confidence score falls below this threshold, the system automatically transitions to slow reasoning mode, thereby initiating further decompositional analysis, iterative reweighting, and cross-referencing with updated domain-specific knowledge and compliance rules. The threshold itself is dynamically adjustable in response to domain-specific requirements, recent performance outcomes, or changes in environmental variables affecting system reliability. This dynamic switching mechanism ensures that the system efficiently balances rapid response generation with the need for thorough verification, resulting in final outputs that are both timely and underpinned by rigorous domain-specific evidence and rule-based validation prior to presentation via the user interface.

Thus, incorporation of explicit, verifiable external citations within the LLM-generated explanations bolsters the transparency, reliability, and traceability of the system's outputs across multiple domains, ensuring that each answer is substantiated by documented evidence from recognized authoritative sources.

In this embodiment, the knowledge base comprises both symbolic rules and machine-learned patterns. The structured knowledge base maintained within the expert system module includes a repository of formal logic-based rules as well as patterns derived from statistical learning methods. The symbolic rules are codified as deterministic if-then conditions, enabling the expert system to execute rule-based reasoning to deduce candidate solutions, legal analyses, diagnoses, or problem-solving strategies in accordance with established regulatory standards and domain-specific procedures. In contrast, the machine-learned patterns are generated from extensive training data and capture probabilistic relationships and context-dependent nuances that are not explicitly represented by symbolic logic. During processing, the expert system references the symbolic rules to ensure consistency and adherence to predefined standards while concurrently employing machine-learned patterns to recognize emerging trends and interpret unstructured or complex data inputs. This dual approach allows the system to rapidly extract precise information using the token-based search engine and to identify broader contextual similarities through the semantic vector search engine, thereby enhancing the overall retrieval mechanism (S108). The integration of these two types of knowledge enables the LLM modules (S112) to incorporate both deterministic reasoning and probabilistic insights in the natural language explanation and answer generation process. Moreover, the weighting engine (S114) is configured to assign appropriate weights to outputs generated by both symbolic reasoning and machine learning-based inference, thus computing a preliminary output that reflects a balanced consideration of rule-based consistency and data-driven adaptability. Subsequent validation by the output guardrail module (S116) ensures that the combined output complies with domain-specific standards, while the refinement module (S118) re-ranks and cross-references the result with up-to-date peer-reviewed content, further normalizing findings against historical data. This hybrid knowledge base, by harmonizing the strengths of deterministic symbolic rules with the flexibility of machine-learned patterns, significantly improves the overall accuracy, transparency, and adaptability of the system across legally, medically, and scientifically oriented applications, as well as in general-purpose problem-solving contexts.

In one embodiment, the expert system further comprises a feedback module configured to receive and process user feedback related to previous outputs and problem-solving interactions. The feedback includes explicit corrective instructions provided by the user, ratings of solution quality, or behavioral indicators captured during system use. The expert system aggregates such feedback and employs a learning mechanism to update its domain-specific knowledge base, enhance its rules engine, and refine its reasoning processes in order to better align future outputs with user expectations and requirements. The feedback module uses machine learning techniques—such as supervised learning or reinforcement learning—to iteratively modify weighting parameters used by the weighting engine and to recalibrate both the semantic vector search engine and the token-based search engine within the dual retrieval mechanism. Additionally, the module adjusts the fine-tuning parameters of the LLM module in response to the received feedback, thereby enabling the natural language explanation and answer generation processes to more accurately reflect current user needs and domain-specific protocols. By incorporating user feedback, the expert system dynamically updates its processing algorithms and domain ontologies, yielding an adaptive and continuously evolving system that enhances problem-solving performance over time. Furthermore, the integration of feedback ensures that subsequent queries benefit from a better understanding of user behavior and context, ultimately resulting in higher quality outputs, greater transparency, and more reliable results across various domains.

In certain embodiments, the system supports integration with external computational tools for specific sub-tasks, thereby extending its functionality beyond internal processing components. After a user query is received via at least one user interface (S100) and analyzed to identify the relevant domain and subdomain (S104), the system determines that portions of the query require specialized computational resources not available within the internal expert system module (S102). For example, when a sub-task involves complex numerical simulation, large-scale data analytics, or specialized algorithmic processing, the expert system activates a dedicated communication protocol to interface with an external computational tool. This interface, which includes application programming interfaces (APIs) or other standardized data exchange formats, facilitates the transmission of candidate sub-task data, task-relevant parameters, and initial candidate answers generated using encoded rules (S110). The external computational tool processes the information using its optimized algorithms and returns enhanced data, refined analytical outputs, or further processed solutions. The system receives these externally generated outputs and incorporates them into the candidate solution set prior to further processing.

In one embodiment, the integration of external computational tools occurs concurrently with or subsequent to the internal dual retrieval mechanism comprising semantic vector and token-based search engines (S108). This design enables the external tools to complement or validate information retrieved from external knowledge bases. Once the external computational outputs are received, the expert system—using its weighting engine (S114)—assigns appropriate weights to the external outputs and combines them with candidate answers generated internally by both expert subsystems and agentic AI LLM modules (S112). The incorporation of external computational tool outputs undergoes additional verification by the output guardrail module (S116) and further refinement via the refinement module (S118), ensuring that the integrated external results comply with domain-specific standards, regulatory requirements, and transparency indicators.

In one embodiment, the system supports collaborative problem-solving by simulating a team of specialized expert agents. In this configuration, the expert system module assigns a plurality of agentic AI LLMs to emulate distinct team members, each possessing specialized expertise in specific aspects of the problem domain. The expert system generates a set of candidate solution strategies and sub-tasks from the provided problem statement and distributes these among the simulated expert agents. Each agent is configured to perform detailed analyses, produce candidate solutions, and offer natural language explanations for its assigned sub-task based on its specialized domain knowledge. The system employs a dynamic workflow that facilitates iterative feedback among the simulated expert agents, enabling them to communicate results and collaboratively refine their proposed solution strategies. A weighting engine aggregates the outputs from the various agents by assigning relative weights based on confidence scores and the relevance of each agent's expertise to its sub-task. The aggregated candidate solutions are then verified for logical consistency and compliance with domain-specific rules by the expert system, which employs both rule-based and symbolic reasoning. Furthermore, the system is configured to monitor the complexity of the problem statement and, when required, dynamically augment the simulated team by assigning additional specialized agents to address emerging interdependencies. In certain embodiments, the system simulates a peer-review process among the specialized expert agents by cross-validating each agent's contribution against historical data, real-world outcomes, or additional external references. The final output comprises an aggregated solution that is refined, verified, and presented via the user interface, accompanied by a detailed natural language explanation, thereby ensuring that the collaborative problem-solving process delivers a robust, multi-faceted, and compliant solution.

In one embodiment, after the expert system aggregates the verified sub-task solutions into the final solution (S414) and generates a natural language explanation (S416), the final solution is routed to a human expert for review prior to delivery to the user. In this embodiment, the human expert examines both the aggregated final solution and the accompanying explanation to ensure that all candidate answers have been accurately weighed and that the combined output fulfills the necessary domain-specific criteria, regulatory compliance standards, and quality benchmarks. The human expert also reviews the solution against additional external references or updated domain standards that are not fully captured by the automated processes. Following the human review, the final solution, along with any modified explanation based on the expert's feedback, is then approved for output to the user via the user interface. This additional review step provides an extra layer of validation, ensuring that the automated system's weighted combination and refinement processes accurately represent the most current and correct domain knowledge and that any potential gaps in the dual retrieval or LLM-generated reasoning are addressed before the user receives their final answer.

In one embodiment, the method is implemented in a distributed computing environment in which patient data is received through one or more interfaces. At step S500, patient data comprising at least one of symptoms, medical history, or physiological sensor data is acquired. The received data is then forwarded to an expert system module that is programmed to interface with a treatment ontology and a rules database. The treatment ontology contains a structured representation of relationships among diseases, symptoms, drugs, and treatments, while the rules database comprises medical guidelines, established protocols, and regulatory standards.

In parallel with the generation of candidate outputs, the expert system continually updates the treatment ontology and the rules database in response to newly published peer-reviewed journal content (step S510). This updating process involves extraction and normalization of efficacy data from new drug trials, ensuring that the ontology reflects the latest clinical data. The normalization process compares the new efficacy data with established treatment regimens and outcomes, thereby integrating emerging clinical insights with historical data. This dynamic updating mechanism allows the system to remain current with evolving medical standards and research findings.

The expert system includes a step to discount marketing inflation of drug efficacy claims (step S512). In this step, normalized trial results are compared against real-world treatment outcomes. By benchmarking new efficacy claims against accumulated historical data, the expert system adjusts or factors out any inflated claims that have been disproportionately influenced by marketing efforts. This discounting ensures that the candidate diagnoses and treatment options provided to the user rely on accurate and evidence-based data, free from misleading performance enhancements.

After processing the input data, integrating new clinical insights, and normalizing efficacy claims, the expert system compiles the final output. At step S514, the system provides candidate diagnoses, treatment options, and a natural language explanation to a user. The user—whether a healthcare practitioner or a patient subject to appropriate regulatory frameworks—receives the output through a designated user interface. The output is designed to present not only the recommended diagnostic and treatment options but also the underlying rationale, including supporting references that facilitate further validation of the proposed clinical strategy.

By integrating real-time patient data collection, structured knowledge retrieval from comprehensive medical ontologies and rules databases, dynamic updating with current clinical evidence, normalization of efficacy data, and natural language explanation by a fine-tuned LLM, the method provides controlled recommendations that are both up-to-date and clinically reliable. The method thereby enhances clinical decision making by offering transparent, reproducible, and evidence-supported medical guidance within a computer-implemented framework.

The system is further configured to integrate prior diagnosis and treatment data into the expert system rules database. In one embodiment, the expert system module collects historical records comprising previous diagnoses, corresponding treatment regimens, and patient outcomes from clinical practice. This prior diagnosis and treatment data is encoded into the rules database, thereby augmenting domain-specific knowledge with real-world evidence. The integration process ensures that the expert system rules are dynamically updated to reflect both recent peer-reviewed literature and historical clinical trends. When a query is received, the expert system utilizes not only static domain ontologies and external knowledge bases but also leverages this accumulated historical data to refine candidate diagnoses and treatment options. For example, the system processes the integrated data to determine diagnostic trends, treatment success rates, and correlations between patient symptoms and outcomes. It then generates candidate answers with associated confidence scores that take into account the effectiveness of past treatments. This integrated historical information is further used to adjust weighting factors assigned by the weighting engine, ensuring that candidate answers generated by both rule-based processing and agentic AI language models are based on a comprehensive understanding of both current medical knowledge and validated historical practices. The output guardrail module subsequently verifies the preliminary output using compliance rules, domain standards, and transparency indicators, incorporating the integrated prior data to discount inflated claims or anomalous treatment results. Through the continuous incorporation of prior diagnosis and treatment data into the expert system rules database, the system not only enhances the validity and reliability of its outputs but also ensures that the final answer provided to the user is substantiated by robust historical evidence and real-world effectiveness data.

In some embodiments, the system receives patient data that includes, in addition to symptoms and medical history, physiological sensor data that comprises at least one of heart rate, sleep patterns, or activity levels. The heart rate data is acquired continuously or at predetermined intervals via wearable or implantable sensors and is processed to determine not only average values but also dynamic variations and heart rate variability. This data is further analyzed to identify arrhythmic patterns or deviations from individualized baselines, thereby providing insight into the patient's cardiovascular status. Sleep pattern data is captured using sensors that detect various sleep stages, including rapid eye movement (REM) sleep, shallow sleep, and deep sleep, which collectively contribute to an assessment of sleep quality and potential sleep disorders. Activity level information, obtained through accelerometers or similar devices, is used to determine the intensity and duration of physical activity as well as periods of sedentariness. The sensor data goes through filtering and normalization routines to reduce noise and artifacts before integration with other patient data elements. The expert system module leverages the physiological sensor data in combination with structured knowledge from a treatment ontology and a rules database to generate candidate diagnoses and treatment options. The system correlates deviations in heart rate, alterations in sleep patterns, and variations in physical activity with clinical rules and historical data to adjust diagnostic confidence scores and treatment recommendations. Additionally, the LLM module incorporates this sensor data when generating a natural language explanation, ensuring that the description of the candidate diagnoses and accompanying treatment options accurately reflects the patient's current physiological condition. The system continuously updates the ontology and rules database based on new sensor readings and compares the results against real-world outcomes, thereby discounting any potential inflated claims or biases and ensuring the reliability of the final output provided to the user.

In one embodiment, the expert system applies probabilistic reasoning to generate confidence scores for each candidate diagnosis. The candidate diagnoses produced based on the retrieved medical knowledge from the treatment ontology and rules database are evaluated using probabilistic models that consider the consistency of the associated structured data, historical diagnostic trends, and relevant statistical parameters derived from domain-specific literature. These probabilistic confidence scores are computed by analyzing the relative contributions of each data source and by estimating the likelihood that a given diagnosis accurately reflects the patient's symptoms, medical history, or physiological sensor data. The calculated scores serve as quantitative measures of reliability and are integrated with the rule-based evaluations to prioritize diagnoses that demonstrate higher statistical certainty. The weighted combination produced by the weighting engine factors in these probabilistic confidence scores, ensuring that subsequent processing by the LLM module includes an assessment grounded in statistical likelihood. Consequently, when the LLM module generates a natural language explanation and answer, it incorporates not only narrative reasoning and references to supporting evidence but also highlights the confidence levels assigned to each candidate diagnosis, thereby providing enhanced transparency and assurance in the final diagnostic recommendations.

In one embodiment, the expert system employs Bayesian models to perform indirect or mixed treatment comparisons for new drug efficacy. In certain implementations, after candidate diagnoses and corresponding treatment options have been generated based on received patient data (S500) and retrieved medical knowledge from a treatment ontology and rules database (S502), the expert system applies Bayesian modeling to further refine new drug efficacy assessments. The Bayesian models integrate prior knowledge—such as historical efficacy data from clinical trials and real-world treatment outcomes—with newly obtained data from recent clinical studies or published peer-reviewed content. By calculating posterior probabilities from these combined data sources, the expert system is capable of performing indirect comparisons between treatments not directly compared in head-to-head trials as well as mixed treatment comparisons when different sources of evidence are available. This approach allows the system to normalize new treatment efficacy claims by benchmarking them against established efficacy profiles, thereby discounting inflated claims and ensuring statistically robust evaluations. The outputs from the Bayesian analysis are used to update the candidate treatment options provided to the user and trigger adjustments in the underlying ontologies and rules databases (S510, S512) in response to the latest published findings. Consequently, incorporating Bayesian models enhances the reliability and transparency of the system by providing users with treatment recommendations that reflect an integrated analysis of both historical and emergent clinical data.

In one embodiment of one implementation, the agentic AI LLM(s) are further configured to generate follow-up questions to solicit additional information from the user, thereby enabling refinement of the candidate diagnoses. The system processes patient data received via the user interface (S500), retrieves relevant medical knowledge from a treatment ontology and rules database (S502), and generates a set of candidate diagnoses and corresponding treatment options based on the patient data (S504). In response to these candidate diagnoses, the LLM module (S506, S508) not only generates a natural language explanation incorporating references from relevant medical literature but also produces targeted follow-up questions designed to clarify ambiguities in the provided patient information and to capture additional details related to patient symptoms, medical history, or sensor readings. These follow-up questions are generated based on the initial candidate diagnoses to help narrow the scope of diagnostic options and improve the overall accuracy and confidence of the diagnosis. When the user responds to these follow-up questions, the additional input is integrated into the expert system's reasoning process, allowing the system to re-assess and refine the candidate diagnoses. The updated candidate diagnoses are then verified by the expert system using the selected rules and normalized against historical and real-world data before the verified candidate diagnoses and treatment options, along with a detailed natural language explanation that includes the iterative refinement process, are provided to the user (S514).

In one embodiment, the candidate treatment options, generated based on the patient data, treatment ontology, and rules database, are further ranked according to normalized drug response metrics. The expert system retrieves efficacy data from clinical trial results and real-world treatment outcomes, which are then normalized against established standards or historical data to provide a quantitative measure of drug response. These normalized metrics are applied within the weighting engine to assign relative weights to each candidate treatment option, thereby enabling the system to dynamically prioritize treatments that have a higher predicted therapeutic benefit. In this manner, the treatment options are not only validated based on rule-based analyses and supporting medical literature, but are also re-ordered by the refinement module using the normalized drug response data. This approach ensures that the final candidate treatment options presented are those most likely to yield effective clinical outcomes and are reflective of the most current and relevant efficacy information available.

The expert system cross-references patient data with electronic health records to identify relevant comorbidities by matching the received patient information—including symptoms, medical history, and physiological sensor data—with clinical data stored in electronic health records. In one embodiment, after patient data is received (S500), the expert system not only retrieves relevant medical knowledge from a treatment ontology and rules database (S502) but also accesses corresponding electronic health records associated with the patient. The system then compares the acute and chronic conditions identified in the patient data with historical data from the electronic health records by matching these details using a predefined set of rules and matching criteria. Patterns and correlations indicative of comorbid conditions are thereby identified, and the system flags comorbidities that influence diagnostic outcomes or treatment strategies. The process further includes updating the expertise base to reflect new findings from the health records and normalizing any discrepancies against established medical standards so that candidate diagnoses and treatment options generated (S504) incorporate these comorbidities. By integrating cross-referenced electronic health records into its analysis, the expert system enhances the clinical relevance and accuracy of its recommendations, ensuring that the final output reflects the full scope of the patient's health context.

In one embodiment, the expert system continuously monitors the treatment ontology and rules database for potential adverse drug interactions. Upon detecting such interactions, it generates an alert incorporated into the overall analysis. The expert system cross-references the structured relationships among drugs, treatments, and physiological data stored within the ontology to identify combinations that result in clinically significant interactions. When a potential adverse drug interaction is detected, the system retrieves specific details from the ontology regarding the drugs involved, the nature and severity of the interaction, and any relevant contraindications. The generated alert is then integrated with candidate diagnoses and treatment options, with the weighting engine assigning an appropriate significance level based on the retrieved evidence. This alert is communicated to the user through the user interface along with a natural language explanation produced by the LLM module, which references supporting evidence from peer-reviewed medical literature. In this manner, the expert system not only provides a refined set of treatment recommendations but also proactively ensures patient safety by continuously evaluating drug interaction risks in accordance with the established domain-specific ontology and clinical guidelines.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, which are contemplated to be sequenced, combined or intermixed in any order.

The invention claimed is:

1. A computer-implemented system for generating domain-specific answers using a hybrid expert system and large language model (LLM) architecture, the system comprising:
- an expert system comprising a plurality of domain-specific expert subsystems, each subsystem including a rules engine, a structured knowledge base, and a domain ontology, the expert system configured to:
  - analyze a user query to identify a domain or subdomain;
  - select one or more expert subsystems based on the identified domain;
  - retrieve information from at least one knowledge base using one of (i) a semantic vector search engine and (ii) a token-based search engine;
  - generate candidate answers and confidence scores for the query based on the retrieved information and rules;
- at least one LLM, each LLM fine-tuned on domain-specific corpora and configured to receive the user query, retrieved information, and candidate answers, and to generate a natural language explanation and answer by incorporating retrieved knowledge into its reasoning;
- a weighting engine configured to assign weights to each candidate answer and to each LLM-generated answer, and to compute a weighted combination to produce a preliminary output;
- an output guardrail module configured to validate the preliminary output using compliance rules, domain standards, and transparency indicators; and
- wherein the system is configured to further process the preliminary output by re-ranking, cross-referencing with up-to-date peer-reviewed content, and normalizing new findings against historical or real-world data;
- wherein the system is configured to provide, via a user interface, an answer comprising the output, an explanation, and supporting evidence or sources.

2. The system of claim 1, wherein the expert system comprises a rule-based subsystem and a case-based reasoning subsystem, and is configured to select between or combine these subsystems based on a query type or domain.

3. The system of claim 1, wherein the expert system further comprises a workflow engine configured to orchestrate multiple expert subsystems and LLM modules in parallel or serial configurations.

4. The system of claim 1, wherein the LLM comprises a plurality of agentic LLMs, each specialized for a different domain or subdomain, and the system dynamically assigns agentic LLMs based on the identified domain of the user query.

5. The system of claim 1, comprising a hybrid data integration interface configured to aggregate heterogeneous data sources, including structured, semi-structured, and unstructured data.

6. The system of claim 1, wherein the weighting engine is trained using supervised learning on historical query-answer pairs to optimize answer selection for accuracy and relevance.

7. The system of claim 1, wherein the output guardrail includes a compliance engine for domain-specific regulatory, ethical, or legal standards.

8. The system of claim 1, wherein the system is configured to incorporate human-in-the-loop review for answers exceeding a predefined risk or complexity threshold.

9. The system of claim 1, wherein the system supports iterative multi-turn dialogue with the user for clarification and refinement of the query and answer.

10. The system of claim 1, wherein the expert system and the LLM are hosted on separate servers and communicate via a secure application programming interface (API).

11. The system of claim 1, wherein the system is implemented as a cloud-based platform-as-a-service (PaaS) or as an on-premises deployment.

12. The system of claim 1, wherein the system further comprises an audit trail configured to log all rule applications, LLM outputs, and decision steps for transparency and compliance.

13. The system of claim 1, wherein the system is configured to dynamically update its rules, ontologies, and LLM fine-tuning datasets in response to newly published peer-reviewed literature, regulatory changes, or case law.

14. The system of claim 1, wherein the system supports multi-agent collaboration, with each agentic subsystem or LLM performing a specialized role such as information extraction, research, compliance analysis, or drafting.

15. The system of claim 1, wherein the system is configured to redact confidential or sensitive information from outputs in compliance with privacy or data protection regulations.

16. The system of claim 1, wherein the system supports multi-jurisdictional or multi-disciplinary analysis by selecting rules, ontologies, and LLMs specific to different legal systems, medical specialties, or scientific fields.

17. The system of claim 1, wherein the system includes a transparency indicator engine that provides confidence levels and supporting evidence for each answer.

18. The system of claim 1, wherein the system supports both parallel and serial architectural arrangements of expert system and LLM modules, including ensemble, pipeline, and feedback loop configurations.

19. The system of claim 1, wherein the system is configured to allow user or administrator selection of architectural variations, including the choice of retrieval mechanisms, rule engines, LLM models, workflow orchestration, and compliance modules.

20. A computer-implemented method for providing controlled, domain-specific answers to user queries using a hybrid large language model (LLM) and expert system having a plurality of domain-specific expert subsystems, each subsystem including a rules engine, a structured knowledge base, and a domain ontology, the method comprising:
- receiving a user query relating to a domain;
- identifying, by the expert system, a relevant subdomain or field for the query and selecting a corresponding set of expert system rules and domain ontologies;
- assigning, by the expert system, one or more agentic AI LLMs specialized in the identified field to process the query;
- retrieving, by the expert system, structured knowledge from domain-specific ontologies, prior training data, and rules databases, the knowledge comprising relationships among entities, domain-specific procedures, and authoritative references;
- generating, by the expert system, a set of candidate analyses, diagnoses, or answers based on the user query, the selected expert system rules, and the retrieved structured knowledge;

inputting the user query, candidate analyses, and supporting references into one or more assigned agentic AI LLM(s);

generating, by the agentic AI LLM(s), a natural language explanation and answer, the explanation comprising logical reasoning and references to supporting evidence from domain literature or legal authority;

verifying, by the expert system, a consistency and validity of the LLM-generated answer using the selected expert system rules, prior outcomes, and domain-specific reasoning;

updating, by the expert system, the ontologies and rules databases in response to newly published peer-reviewed journal content, regulatory updates, or case law, the updating comprising extracting and normalizing efficacy or outcome data against existing standards or regimens; and providing, to the user, the verified answer and the natural language explanation.

* * * * *